(12) United States Patent
Bosko et al.

(10) Patent No.: US 9,583,015 B2
(45) Date of Patent: Feb. 28, 2017

(54) CONTEMPORANEOUS CAPTURE AND TAGGING OF MEDIA EVIDENCE FOR EDUCATION EVALUATION

(71) Applicant: Pearson Education, Inc., Upper Saddle River, NJ (US)

(72) Inventors: Mark Anthony Bosko, San Antonio, TX (US); Macklin Lamont Johnson, Lakeville, MN (US); Adam James Rippentrop, Tipton, IA (US)

(73) Assignee: PEARSON EDUCATION, INC., Upper Saddle River, NJ (US)

( * ) Notice: Subject to any disclaimer, the term of this patent is extended or adjusted under 35 U.S.C. 154(b) by 239 days.

(21) Appl. No.: 14/267,213

(22) Filed: May 1, 2014

(65) Prior Publication Data

US 2015/0317906 A1   Nov. 5, 2015

(51) Int. Cl.
   G09B 7/00 (2006.01)
   G09B 5/08 (2006.01)
(52) U.S. Cl.
   CPC ..................... G09B 5/08 (2013.01)

(58) Field of Classification Search
   USPC ........................................ 434/362
   See application file for complete search history.

(56) References Cited

U.S. PATENT DOCUMENTS

2010/0299443 A1* 11/2010 Hu .................. H04N 7/165
                                                   709/231
2014/0143439 A1*  5/2014 Ramamurthy ... H04N 21/23439
                                                   709/231

* cited by examiner

Primary Examiner — Kesha Frisby
(74) Attorney, Agent, or Firm — Kilpatrick Townsend & Stockton LLP

(57) ABSTRACT

An educational evidence and evaluation system for generating media files and context parameters and linking the media files and context parameters to education profiles during evaluation of a subject is disclosed. An example educational evidence and evaluation system comprises a capture engine that captures two media files, a context engine that tags the media files with context parameters, and a linking engine that links the media files and their tagged context parameters to an education profiles of a subject, wherein the evaluation engine links a first media file and its first context parameter to the education profile of a first subject before the capture engine captures a second media file.

20 Claims, 16 Drawing Sheets

CONTEMPORANEOUS CAPTURE AND TAGGING OF MEDIA EVIDENCE FOR EDUCATION EVALUATION

FIELD OF THE INVENTION

This disclosure relates in general to evaluation within an educational setting. More particularly, this disclosure relates to capturing media evidence for evaluation of a subject.

BACKGROUND

Some evaluators find it difficult to capture media evidence to use in the evaluation of their subjects, such as students, when the evidence becomes available because of their busy schedule and because of the fast-paced nature of many educational settings. Some evaluators find it even more difficult to give context to that evidence in an efficient, effective, and timely fashion because of similar constraints. Evidence may become stale, or context may be forgotten, as more time passes from the date and time the evidence became available or was observed by the evaluator.

A system and method are needed for evaluators to capture, give context to, and upload such media evidence on the fly as the evidence is observed or shortly thereafter.

SUMMARY

The present disclosure describes, for example, an apparatus and process for an evaluator to capture media evidence related to an evaluatee, assigning or tagging that evidence with context, and then linking that evidence with tags to an evaluation system associated with the evaluator and evaluate. In an illustrative example, an evaluator (e.g. instructor/teacher) may observe a student in a classroom environment while the student is performing a lesson and interacting with other students. The teacher may interpret the actions taken by the student as important for evaluation of the student. The teacher may then take a picture (still image) of the student to capture evidence of the action taken by the student. The teacher may then edit or tag the image with context, including, for example, the name of the student in the image, notes about why the image is useful evidence for the student's evaluation, among others. The teacher may then, immediately or soon after capturing and tagging the image, upload the image to an evaluation system including, for example, a student and/or classroom profile. The teacher may then not be required to later assign context to the media evidence or upload the evidence into the evaluation system.

This disclosure relates in general to capturing media evidence in an evaluation setting, and more particularly but not by way of limitation, to capturing a media file, tagging that media file with context parameters, and linking the media file and context to an evaluation system including subject profiles, amongst other things.

BRIEF DESCRIPTION OF THE DRAWINGS

The present disclosure is described in conjunction with the appended figures.

Figure 1:
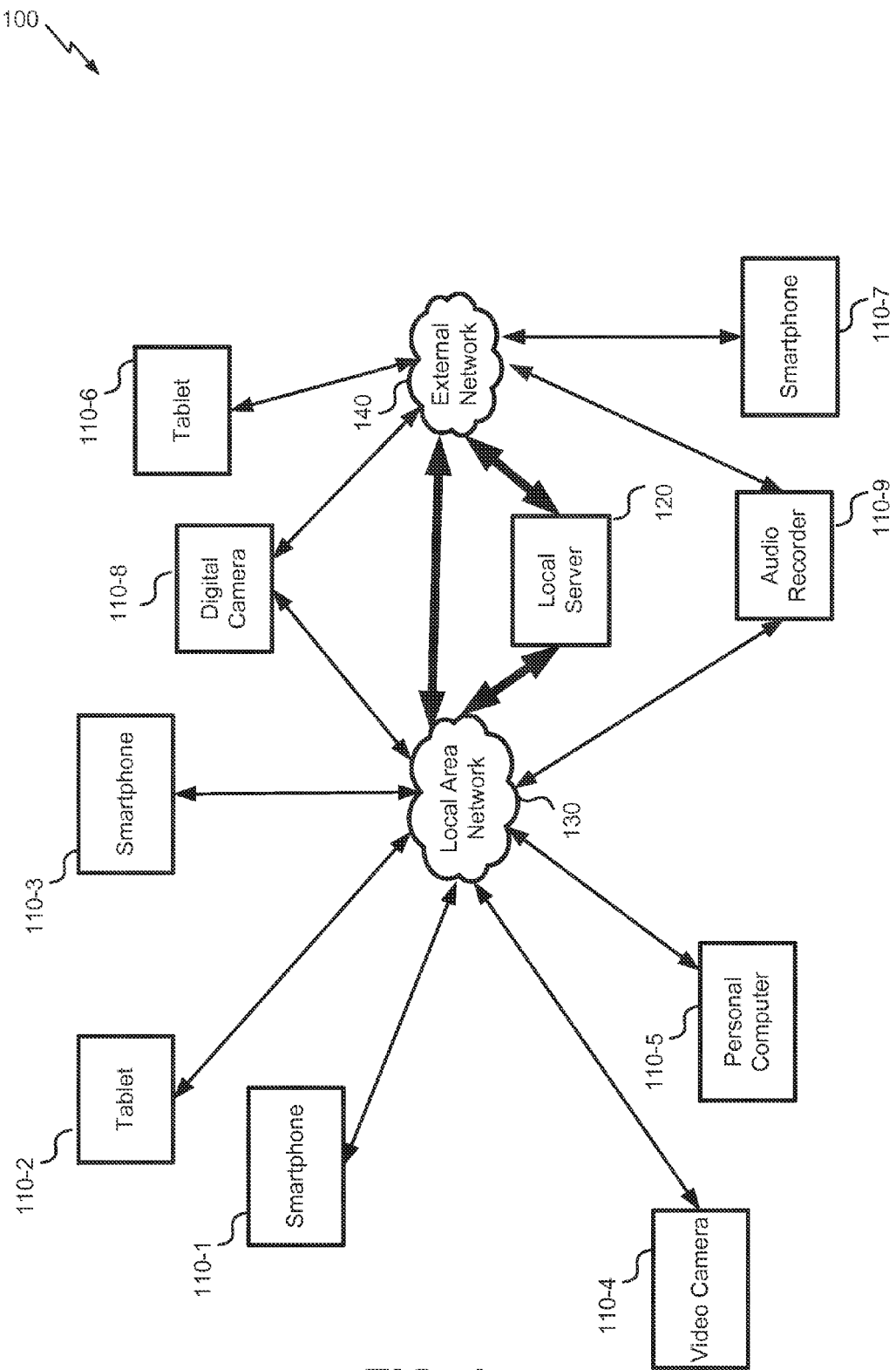
FIG. 1 shows a block diagram of a system for capturing media evidence for evaluation of a subject, according to embodiments of the present invention.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

In the appended figures, similar components and/or features may have the same reference label. Where the reference label is used in the specification, the description is applicable to any one of the similar components having the same reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

In an exemplary embodiment of the present invention, an educational evidence and evaluation system for generating media files and context parameters and linking the media files and context parameters to education profiles during evaluation of a subject is disclosed. The educational evidence and evaluation system may comprise a capture engine that receives a first input from an evaluator to capture a first media file; captures the first media file responsive to the evaluator's first input; sends the first media file for presenting to the evaluator; stores the first media file; receives a second input from the evaluator to capture a second media file; captures the second media file responsive to the evaluator's second input; sends the second media file for presenting to the evaluator; and stores the second media file. The educational evidence and evaluation system may also comprise a context engine that receives a third input from the evaluator indicating a first context parameter; tags the first media file with the first context parameter; stores the first context parameter; receives a fourth input from the evaluator indicating a second context parameter; tags the second media file with the second context parameter; and stores the second context parameter. The educational evidence and evaluation system may also comprise a linking engine that receives a fifth input from the evaluator indicating a first subject parameter for an education profile of the first subject; links the first media file and the first context parameter to the education profile of the first subject based on the first subject parameter; receives a sixth input from the evaluator indicating a second subject parameter for an education profile of the second subject; and links the second media file and the second context parameter to the education profile of the second subject based on the second subject parameter. The evaluation engine may link the first media file and the first context parameter to the education profile of the first subject before the capture engine captures the second media file responsive to the evaluator's second input.

In another exemplary embodiment of the present invention, a method for generating media files and context parameters and linking the media files and context parameters to subject profiles during evaluation of a subject is disclosed. The method may comprise receiving a first input from an evaluator to capture a first media file; capturing the first media file responsive to the evaluator's first input; sending the first media file for presenting to the evaluator; storing the first media file; receiving a second input from the evaluator to capture a second media file; capturing the second media file responsive to the evaluator's second input; sending the second media file for presenting to the evaluator; storing the second media file; receiving a third input from the evaluator indicating a first context parameter; tagging the first media file with the first context parameter; storing the first context parameter; receiving a fourth input from the evaluator indicating a second context parameter; tagging the second media file with the second context parameter; storing the second context parameter; receiving a fifth input from the evaluator indicating a first subject parameter for an education profile of the first subject; linking the first media file and the first context parameter to the education profile of the first subject based on the first subject parameter; receiving a sixth input from the evaluator indicating a second subject parameter for an education profile of the second subject; and linking the second media file and the second context parameter to the education profile of the second subject based on the second subject parameter; wherein the evaluation engine links the first media file and the first context parameter to the education profile of the first subject before the capture engine captures the second media file responsive to the evaluator's second input.

In another exemplary embodiment of the present invention, a non-transitory computer-readable storage medium having instructions stored thereon, which when executed by a computing device, cause the computing device to perform operations comprising: receiving a first input from an evaluator to capture a first media file; capturing the first media file responsive to the evaluator's first input; sending the first media file for presenting to the evaluator; storing the first media file; receiving a second input from the evaluator to capture a second media file; capturing the second media file responsive to the evaluator's second input; sending the second media file for presenting to the evaluator; storing the second media file; receiving a third input from the evaluator indicating a first context parameter; tagging the first media file with the first context parameter; storing the first context parameter; receiving a fourth input from the evaluator indicating a second context parameter; tagging the second media file with the second context parameter; storing the second context parameter; receiving a fifth input from the evaluator indicating a first subject parameter for an education profile of the first subject; linking the first media file and the first context parameter to the education profile of the first subject based on the first subject parameter; receiving a sixth input from the evaluator indicating a second subject parameter for an education profile of the second subject; and linking the second media file and the second context parameter to the education profile of the second subject based on the second subject parameter; wherein the evaluation engine links the first media file and the first context parameter to the education profile of the first subject before the capture engine captures the second media file responsive to the evaluator's second input.

In an illustrative example of embodiments of the present invention, the present disclosure describes an apparatus and process for an evaluator to capture media evidence related to an evaluatee, assigning or tagging that evidence with context, and then linking that evidence with tags to an evaluation system associated with the evaluator and evaluate. In an illustrative example, an evaluator (e.g. instructor/teacher) may observe a student in a classroom environment while the student is performing a lesson and interacting with other students. The teacher may interpret the actions taken by the student as important for evaluation of the student. The teacher may then take a picture (still image) of the student to capture evidence of the action taken by the student. The teacher may then edit or tag the image with context, including, for example, the name of the student in the image, notes about why the image is useful evidence for the student's evaluation, among others. The teacher may then, immediately or soon after capturing and tagging the image, upload the image to an evaluation system including, for example, a student and/or classroom profile. The teacher may then not be required to later assign context to the media evidence or upload the evidence into the evaluation system.

FIG. 1 shows a block diagram of a system for capturing media evidence for evaluation of a subject, according to embodiments of the present invention. The system 100 includes local area network 130, local server 120, external network 140, and media capture devices 110-1, 110-2, 110-3, 110-4, 110-5, 110-6, 110-7, 110-8 and 110-9.

The system 100 includes a local area network 130. Local area network 130 may provide a user with access to various devices (e.g. media capture devices 110) within the network. The local area network may include one or more gateways that provide the media capture devices to local server 120 to store data captured or otherwise stored in the media capture devices. The one or more gateways may also provide the user and the network devices with access to one or more external networks, such as a cloud network, the Internet, and/or other wide area networks. Access to such external networks allows a user to transmit data (e.g., through a network interface, via a network 140, through a wired communication line, etc.) from one of the devices to the server for storage or processing or to an external network. For example, local area network 130 may allow a user of a network device to transmit a captured image, video, or other media (e.g. media evidence captured by an evaluator) to a local server or to an external network. It is desirable for a user to be able to access the local server and/or the external network (e.g., using one of the network devices, such as a mobile device) while located within the local area network and also while located remotely from the local area network.

The system 100 includes a local server 120. Local server 120 is configured to receive data, such as media evidence, from a media capture device to store the media evidence. Local server 120 is also configured to send data, such as media evidence, from server 120 to external network 140 to either be stored in an external server (not shown) or to be integrated with the evaluation system.

The storage medium may be volatile (such as random access memory (RAM)) and/or non-volatile (such as read-only memory (ROM), flash memory, universal serial bus (USB), etc.). The storage medium may also include removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the storage medium may include multiple different types of memory, such as static random access memory (SRAM), dynamic random access memory (DRAM), or ROM.

The system 100 includes one or more media capture devices 110. FIG. 1 shows the use of nine media capture devices, including media capture devices 110-1, 110-2, 110-3, 110-4, 110-5, 110-6, 110-7, 110-8 and 110-9. However, system 100 may include fewer or more media capture devices. Media capture devices 110 shown in FIG. 1 include smartphones 110-1, 110-3, and 110-7, tablets 110-2 and 110-6, video camera 110-4, digital camera 110-8, and audio recorder 110-9. For purposes of illustration and description, system 100 has been shown with a variety of devices in random quantities. System 100 may include fewer or more of any one of the different types of media capture devices, and may include a variety of other types of media capture devices not shown in FIG. 1.

Media capture devices 110 are configured to capture media evidence/files, including images/pictures, video, audio, text, and other types of files (e.g. media) in any format in an educational setting where an evaluator is compiling evidence for evaluation of an evaluatee. Media capture devices 110 may include any hardware available and capable of capturing such media. For example, smartphone 110-1 may include a digital camera, video camera and audio recording device, each of which is capable of capturing media files (e.g. media evidence) to be stored on smartphone 110-1, edited or added to by a user, and sent to another part of the system. The media file may be stored on the media capture device (e.g., local memory, storage medium, etc.). The media capture device 110 may also submit the media file to local server 120. The media capture device 110 may transmit the media file to local server 120 without separately storing the media file on the media capture device 110.

Media capture devices 110 are also configured to display the media file to a user on a graphical user interface (GUI), display, or other device associated with the media capture device configured to display a file to a user.

Media capture devices 110 are also configured to accept inputs from a user, such as an evaluator, to capture a media file, to add context to the captured media file, and/or to send the media file to a part of the system outside of the media capture device. The media capture devices 110 may also receive inputs from a user via an external device, such as a mouse, touch pad, keyboard, or any other input device configured to be connected to or otherwise control inputs to such a media capture device.

In some embodiments, media capture devices 110 are also configured to connect directly to an external network 140, such as the internet or a cloud network, without first passing through local area network 130 or local server 120. As shown in FIG. 1, several media capture devices 110, including smartphone 110-7, audio recorder 110-9, digital camera 110-8, and tablet 110-6, all connect to the external network 140 either in addition to or instead of to local area network 130. Although certain media capture devices 110 are shown in FIG. 1 as being connected to local area network 130, certain media capture devices 110 are shown as being connected to external network 140, and certain media capture devices 110 are shown as being connected to both local area network 130 and external network 140, any of the media capture devices 110 contemplated herein may connected to either or both of local area network 130 and external network 140 or any other network that media capture devices 110 are connected to.

Figure 2:
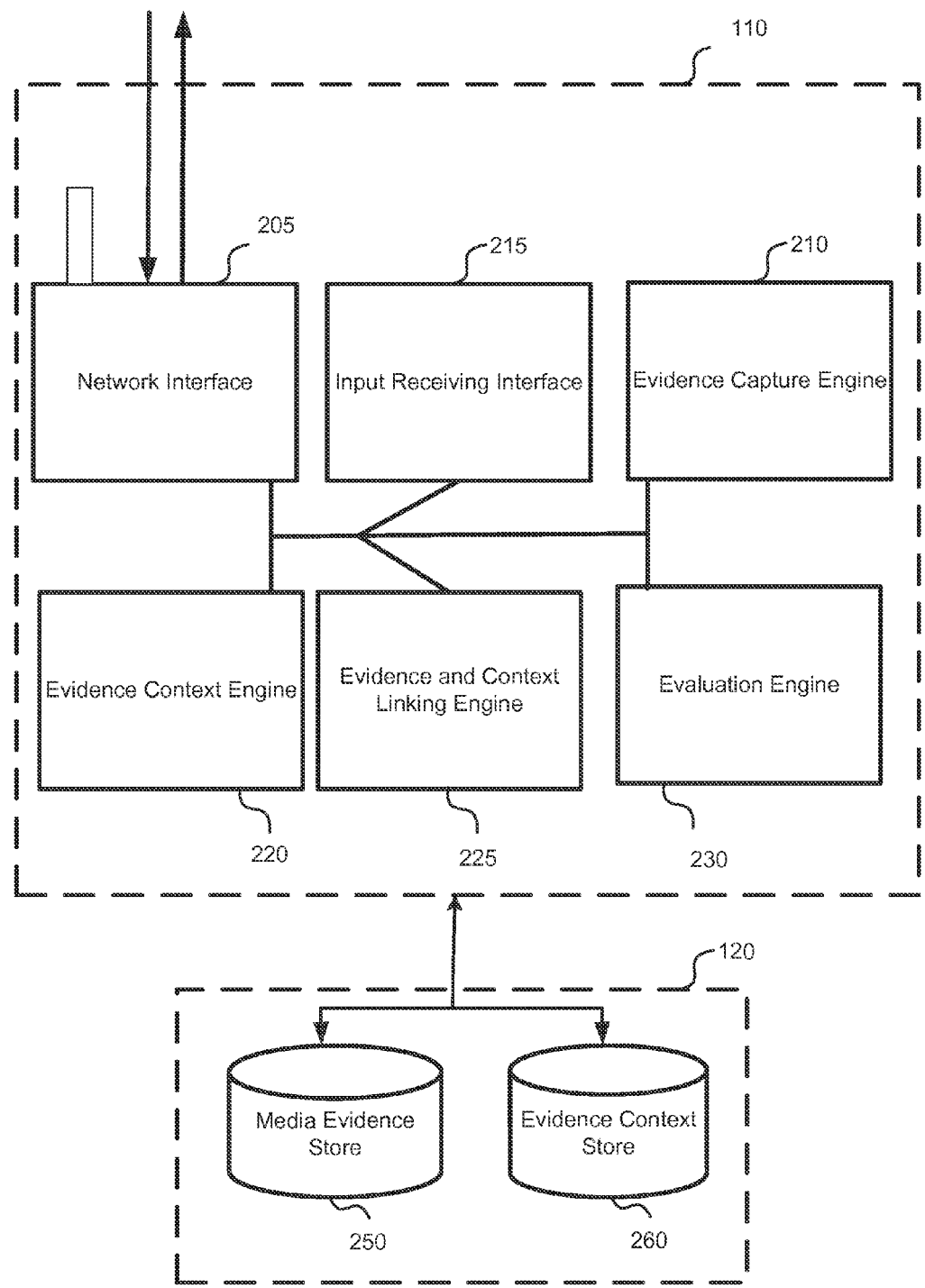
FIG. 2 shows a block diagram of an example media capture device and local server, according to embodiments of the present invention.

FIG. 2 shows a block diagram of an example media capture device 110 and local server 120 as shown in FIG. 1, according to embodiments of the present invention. For example, media capture device 110 includes network interface 205, input receiving interface 215, evidence capture engine 210, evidence context engine 220, evidence and context linking engine 225, and evaluation engine 230. Furthermore, for example, local server 120 includes media file/evidence store 250 and evidence context store 260. It should be appreciated that one or more of these aspects can also or alternatively be implemented, for example, in a different server (e.g. external server) or within a media capture device 110.

Media capture device 110 includes network interface 205. The network interface 205 allows the devices, networks, and other systems to access the other components of the system 100. The network interface 205 includes features configured to send and receive information, including, for example, a network antenna, a modem, a transmitter, receiver, network adapter or any other feature that can send and receive information. The network interface 205 can communicate via telephone, cable, fiber-optic, and other wired communication network, including the local area network 130 and the external network 140. In some embodiments, the network interface 205 communicates via cellular networks, WLAN (wireless local area networking) networks, or any other wireless network.

The network interface 205 can also be configured to send and receive data. In some embodiments, the network interface 205 sends media file/evidence, such as an image/picture, video, audio, etc. to another device, an evaluation system, or any other location useful/necessary for use of the evidence. For example, the media capture device 110 captures media and sends that media, along with any assigned/tagged context from the user, to another location within system 100, which is sent via the network interface 205. The network interface 205 is also configured to enable to the media capture device 110 to communicate through the local area network 130 and the external network 140.

Media capture device 110 also includes input receiving interface 215. Input receiving interface 215 allows a user (e.g. a teacher or other instructor) to input commands into media capture device 110. Input receiving interface 215 may include a touch sensitive (i.e., touch screen) display device. Such a display device may include various tiles, interactive elements, icons, command regions, windows, toolbars, menus, and buttons that are used to initiate action, invoke routines, monitor network devices, control network devices, or invoke other functionality. The initiated actions include, but are not limited to, displaying a state or status of a network device, selecting a network device to control and/or monitor, setting a primary function of a network device, setting a secondary function of a network device, and other inputs and gestures. Input receiving interface 215 may also include other control devices that are not touch sensitive. For example, input receiving interface 215 may include a mouse, keyboard, or any other input device configured to be connected to or otherwise control inputs to such a media capture device.

Input receiving interface 215 is configured to receive various inputs from a user. For example, input receiving interface 215 may receive an input from a user to capture a piece of media evidence, such as a file including images/pictures, video, audio, or other types of media. Input receiving interface 215 may also receive an input from a user that includes context to be connected/tagged to the media file/evidence to give the evidence context. Input receiving interface 215 may also receive inputs from the user to upload the evidence to an evaluation system or otherwise link the evidence to the evaluation system associated with the evaluatee/subject of the evidence. Input receiving interface 215 may also receive various other types of inputs from a user associated with embodiments of the present technology.

Input receiving interface 215 is also configured to display the captured media to the user of media capture device 110. More specifically, receiving interface 215 may, after capturing media in response to an input from a user, send the media for presenting to the user. The media may be presented to the user on the display device. If media capture device 110 is connected to another device that includes a display device or has any other user interface capable of displaying media, input receiving interface 215 may send the media to that external device for displaying the media to the user.

Media capture device 110 also includes evidence capture engine 210. Evidence capture engine 210 is configured to capture evidence, such as media evidence, related to a student or other subject being evaluated by a teacher/instructor or other evaluator. For example, when a user uses the media capture device to capture a piece of media, such as a picture, video, audio, etc., evidence capture engine 210 captures the media file/evidence and is configured to quickly store the media in local storage within the media capture device 110. The media is stored locally within media capture device 110 so as to allow media capture device 110 to later retrieve the media so that the media capture device 110 may assign context to the media and/or link the media to an evaluation system.

For example, evidence capture engine 210 may be connected to a digital camera, video camera or audio recorder within media capture device 110 that captures media evidence. Evidence capture engine 210 is configured to receive a signal from input receiving interface 215, after a user has entered an input at input receiving interface 215, indicating that a user has entered an input to capture media. Evidence capture engine 210 is also configured to capture the media as instructed by the user in conjunction with the media capture device 110 and the media's corresponding hardware. Furthermore, evidence capture engine 210 is configured to process the captured media and process/prepare the media for storage/tagging, which will be discussed in further detail with respect to evidence context engine 220.

Evidence capture engine 210 is also configured to send the media to be displayed to the user. Evidence capture engine 210 may send a signal to the input receiving interface 215 within media capture device 110 for the input receiving interface 215 to display the media to the user. Evidence capture engine 210 may also send the media to an external device for displaying the media to the user.

Media capture device 110 also includes evidence context engine 220. Evidence context engine 220 is configured to assign context to a media file/evidence captured by evidence capture engine 210. Evidence context engine 220 may assign context to a media file in a variety of different ways. Evidence context engine 220 is configured to receive a signal from input receiving interface 215, after a user has entered an input at input receiving interface 215, indicating that a user has entered an input including context for the media evidence.

An input from a user, including context for the media evidence, may be related to any of a variety of characteristics or parameters related to the media file itself or the substance contained within the media file. For example, the context may include characteristics or parameters related to the media file itself, such as metadata including for example the date and/or time the media file was captured. the context may include characteristics or parameters related to the substance contained within the media file, including for example the class or environment within which the media file was captured, the lesson plan during which the media file was captured, one or more subject's names contained within the picture, video, or audio in the media file, performance indicators related to actions the subject takes during, before and/or after the picture, video, or audio in the media file, among many others. For example, the user may indicate in its inputted context for a certain captured media file that a specific student was captured in the media file and that that student was expressing happiness because the instructor had just given the student toy blocks to play with.

Figure 3:
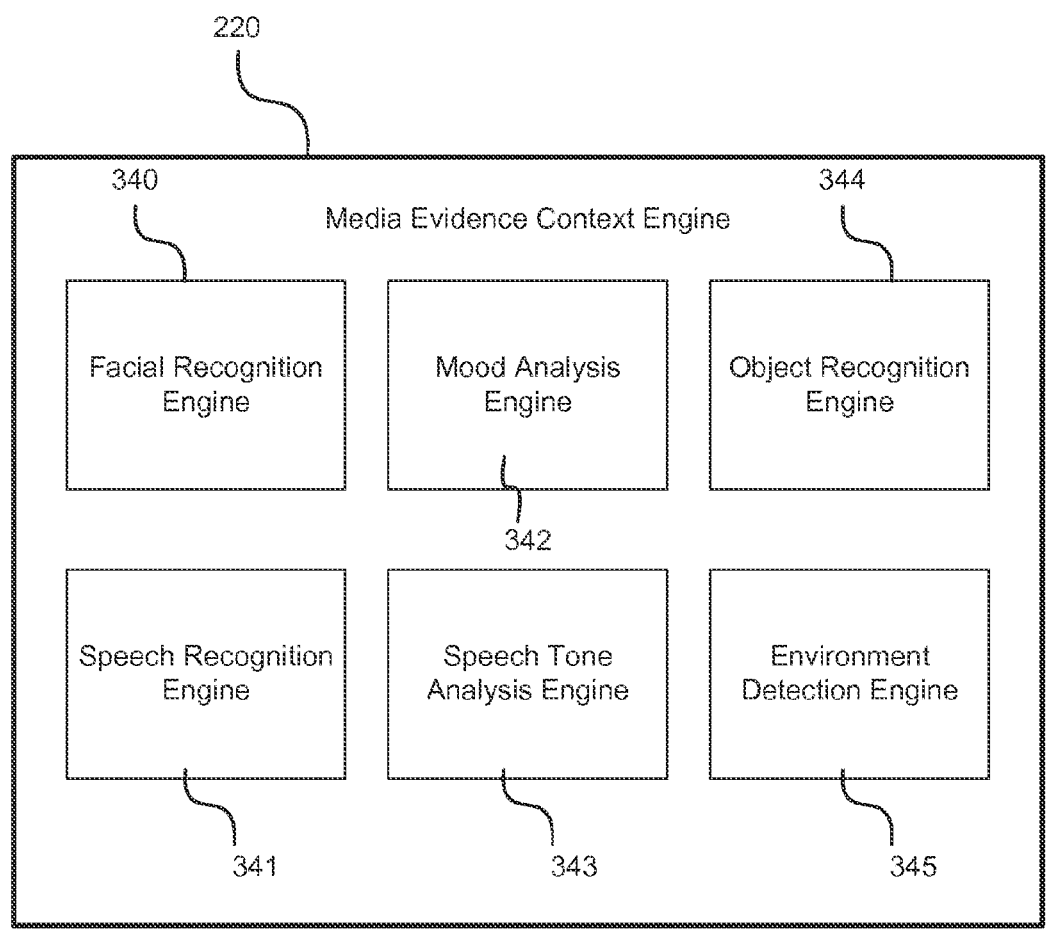
FIG. 3 shows a block diagram of an example evidence context engine, according to embodiments of the present invention.

Evidence context engine 220 is also configured to process a media file including a piece of media evidence to automatically obtain context for the media file. For example, evidence context engine 220 may process a captured media file to obtain context for the media evidence without input from a user, or independent from any input given by a user. FIG. 3 shows a block diagram of an example evidence context engine 220 as shown in FIG. 2, according to embodiments of the present invention. For example, evidence context engine 220 includes facial recognition engine 340, mood analysis engine 342, object recognition engine 344, speech recognition engine 341, speech tone analysis engine 343, and environment detection engine 345. However, engines 340-345 are only exemplary and are not meant to limit the possible engines that could be included within evidence context engine 220. Each of engines 340-345 may process a captured media file to obtain a different type of context for the media evidence within the media file. For example, facial recognition engine 340 is configured to process a captured media file, for example a picture, and determine which subjects are captured in the media evidence based on the faces captured in the picture. Therefore, facial recognition engine 340 may allow evidence context engine 220 to automatically determine the names of the subjects captured in the media evidence so that the user does not have to separately input that information as context.

In another example, evidence context engine 220 includes mood analysis engine 342 configured to process a captured media file, for example a video, to determine the mood or temperament of any subjects within the picture. The mood analysis engine 342 may determine a subject's mood or temperament based on the facial expressions of the subject during the video, the sounds the subject makes during the video, actions the subject takes during the video, among others. Therefore, mood analysis engine 342 may allow evidence context engine 220 to automatically determine the mood/temperament of the subjects captured in the media evidence so that the user does not have to separately input that information as context.

In another example, evidence context engine 220 includes object recognition engine 344 configured to process a captured media file, for example a picture, to determine what objects are captured within the picture. The object recognition engine 344 may determine what objects are in a captured picture based on the shape(s) of the objects, any text written on the objects, the nature of any actions being taken with the objects, among others. For example, object recognition engine 344 may determine that an object in the picture is a baseball based on its round shape, its size, and that a subject is wearing a glove and is throwing the object to another subject. Therefore, object recognition engine 344 may allow evidence context engine 220 to automatically determine which objects are located in a piece of media evidence so that the user does not have to separately input that information as context.

In another example, evidence context engine 220 includes speech recognition engine 341 and speech tone analysis engine 343 configured to process a captured media file, for example an audio file, and determine which subjects are captured in the media evidence based on the speech captured in the picture. Furthermore, speech recognition engine 341 and speech tone analysis engine 343 are configured to process the captured file to determine a variety of other characteristics of a media file as well, including the mood/temperament of a subject in the media file, any sounds made by objects other than a subject to determine the environment that the subject is in, among others. Therefore, speech recognition engine 341 and speech tone analysis engine 343 may allow evidence context engine 220 to automatically determine the names of the subjects captured in the media evidence and/or other characteristics of the evidence so that the user does not have to separately input that information as context.

In another example, evidence context engine 220 includes environment detection engine 345 configured to process a captured media file, for example a picture, and determine in what setting the captured evidence takes place based on any objects or sounds in the picture. For example, if environment detection engine 345 recognizes a plurality of desks and a blackboard in a room, the environment detection engine 345 may determine that the picture was taken of the inside of a classroom. Therefore, environment detection engine 345 may allow evidence context engine 220 to automatically determine the setting and/or other characteristics of the evidence so that the user does not have to separately input that information as context.

Media evidence context engine 220 may automatically determine characteristics about a media file, including evaluation evidence, automatically using one or more of engines 340-345 separately from or in conjunction with user inputs that include additional context regarding the media evidence. For example, the media evidence context engine 220 may automatically determine the date/time that a media file was captured and the two students included in the media evidence, and may also receive a signal from input receiving interface 215 representing an input from a user including contextual notes from the user regarding additional context for the captured evidence.

Referring back to FIG. 2, media capture device 110 also includes evidence and context linking engine 225. Evidence and context linking engine 225, or evaluation linking engine, is configured to link any context associated with a media file including evaluation evidence, whether received from a user or automatically generated, to the media file. In other words, evidence and context linking engine 225 is configured to tag a media file with context, such as characteristics or evaluation parameters based on the media file itself or the substance contained within the media file. Media evidence/files and context for that evidence may be linked in different ways. For example, context may be linked to a media file as one or more of a set of predetermined tags. In other words, the evaluation system may include a list of predetermined categories or labels that a user may choose from in order to assign the content of one or more of those categories/labels to the file. For example, the evaluation system may include a list of students in a class. An instructor may, before or after capturing a piece of evidence for the evaluation system, select one or more students that are contained in the evidence so that the evidence is linked to those one or more students. Such a system may allow for efficient organization of multiple files/evidence. A user may later be able to search through (or filter) evidence based on the predetermined categories or labels. For example, the user may search for only those files that were tagged for a certain student. In this way, context may be associated with evidence as metadata. Therefore, a student name tagged on an evidence file may travel with the evidence whenever it is transmitted from one entity to another, and may be located later based on that tag.

Context may also be linked to a media file as non-predetermined notes, comments, edits, etc. to a media file or evidence. For example, an evaluator may simply add a comment to a picture or video explaining the context of the media evidence, including any observation that the evaluator made but that may not be obvious based on the evidence itself. The evaluator may also add audio, such as an audio file, to the media evidence with his/her own voice explaining a similar context. The evaluator may also edit the media file, such as a picture, by marking the picture with notes, arrows, or any other markings to give added context to the evidence. For example, the evaluator may blur a subject's face for privacy reasons. The evaluator may also add highlighting, or any other way to add emphasis to a certain portion of the evidence. Such context may be associated with or tagged to a media file such that the evaluator may observe the context at any future time when the evaluator views the media evidence. However, such context may not be categorized so as to contribute to the organization of either the media evidence/files or their associated tags.

Media capture device 110 also includes evaluation engine 230. Evaluation engine 230 is configured to send media evidence, along with any of its associated tags/context, to an evaluation system (or, in other words, to link media evidence/file, along with any of its associated tags/context, to the evaluation system). The evaluation system may be stored within media capture device 110, or may be stored on a server external to the evaluation system. The evaluation system may include a variety of profiles. For example, the evaluation system may include a different profile for each evaluated subject (i.e. evaluatee). A profile may include one or more evaluations for its associated evaluated subject, evidence captured by an evaluator, evaluation context for one or more of the pieces of evidence, among other information. When evidence is tagged with a subject's name (e.g. generated at the face recognition engine 340 within media evidence context engine 220), or in other words with a subject profile parameter, and sent to the evaluation system it may then be associated with the subject profile associated with the subject profile parameter. Evaluation engine 230 facilitates the transmission of media evidence captured by media capture device 110, along with any context associated with that evidence, to the evaluation system. Once evidence and its associated context/tags have been transmitted to the evaluation system (and organized according to subject profiles and/or its tags), an evaluator may view and/or organize the evidence within the evaluation system. The evaluation system may include profiles based on tags/parameters other than evaluated subjects. For example, the evaluation system may be organized with profiles associated with each evaluator/teacher, day of the school year, classroom, lesson plan, subject, student performance indicators, questions, response dialog, among others. Furthermore, since evidence may be transmitted with multiple associated tags or context, the evidence may be linked to any of these profiles, and therefore organized by any of its associated tags/profiles.

Although the processes discussed herein with respect to evidence and context linking engine 225 and evaluation engine 230 have been discussed separately and as a part of two separate engines, the processes may be achieved by one combined engine/device. More specifically, a linking/evaluation engine may be configured to link media evidence/files to their respective context/tags, and also upload/send the evidence/files and their respective context/tags to the evaluation system and/or to an external server.

As noted, the media capture device 110 may, after capturing a media file and assigning context to the file, upload the image to an evaluation system immediately or soon after capturing and tagging the image. The user of the media capture device may then not be required to later assign context to the media evidence or upload the evidence into the evaluation system. Furthermore, the media capture device may capture/tag multiple pieces of media evidence in a row, one after another. Therefore, the evaluation engine may link the first media file and the first context parameter to the education profile of the first subject before the capture engine captures the second media file responsive to the evaluator's second input.

The block diagram of FIG. 2 also includes local server 120. As noted, media files/evidence and their corresponding evidence context may be stored within capture device 110. Media files/evidence and their corresponding evidence context may also be stored external to capture device 110 at local server 120. Local server 120 includes, for example, media evidence store 250 and evidence context store 260. Media evidence store 250 is configured to receive data, such as media files/evidence, from a media capture device to store the media evidence. Media evidence store 250 is also configured to send data, such as media files/evidence, from server 120 to external network 140 to either be stored in an external server (not shown) or to be integrated with the evaluation system. Evidence context store 260 is configured to receive data, such as media files/evidence context data, from a media capture device to store the media evidence context. Evidence context store 260 is also configured to send data, such as media files/evidence context, from server 120 to external network 140 to either be stored in an external server (not shown) or to be integrated with the evaluation system. Local server 120 may store any information/data related to media files/evidence, their associated context/tags, and any link between the two.

Figure 4:
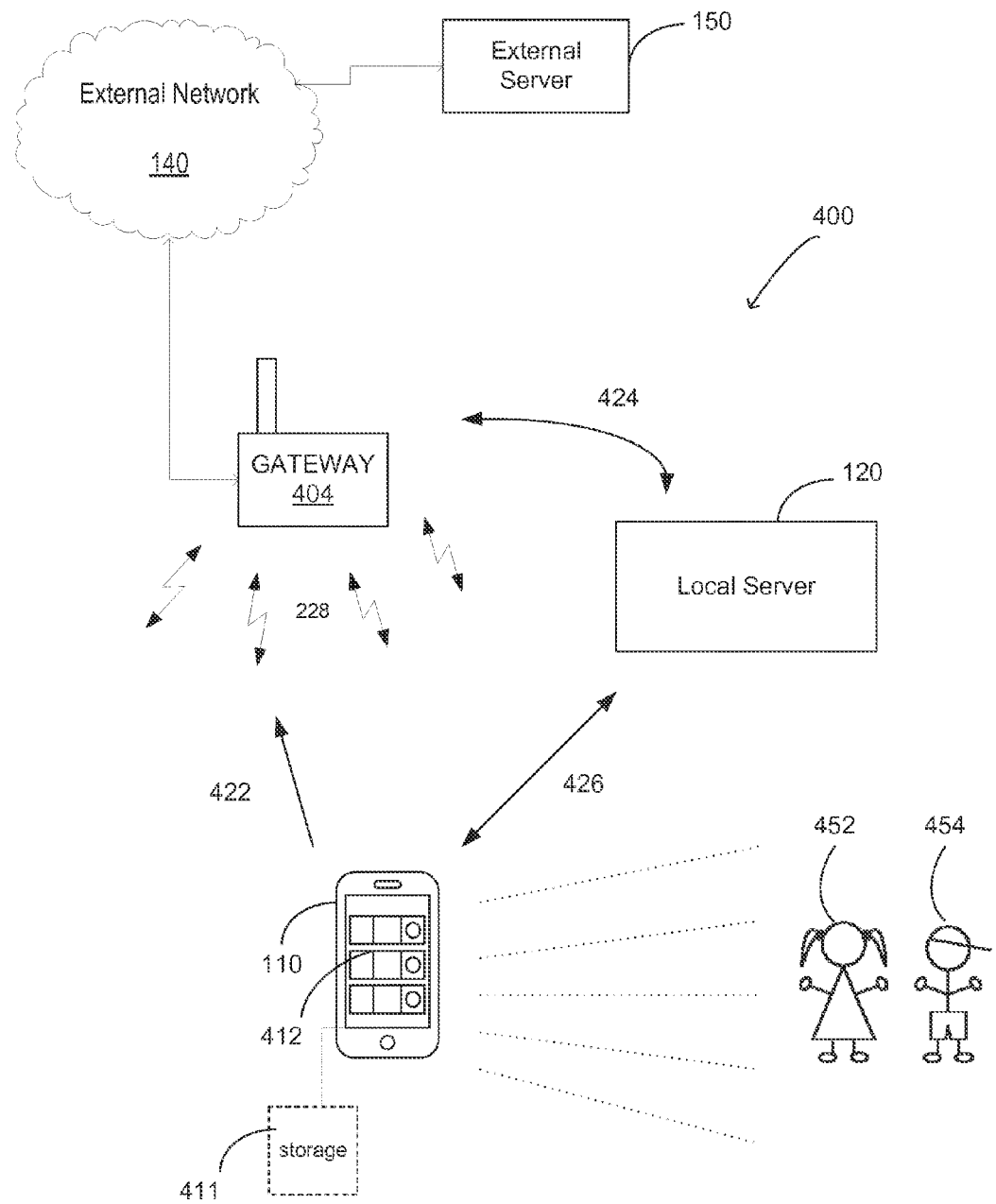
FIG. 4 shows an example of a wireless network including a media capture device, according to embodiments of the present invention.

FIG. 4 shows an example of a wireless network 400, according to embodiments of the present invention. Network 400 includes media capture device 110, local server 120, gateway 404, external network 150, and external server 150. Media capture device 110, local server 120, gateway 404 and external network 150 have each been described herein with respect to FIG. 1. Media capture device 110 (e.g. smartphone, tablet, personal computer, video camera, audio recorder, etc.) may capture media, such as a picture or video, of one or more subjects, such as subjects 452 and 454. Subjects 452 and 454 may be students in an educational setting such as a classroom or any other subject being exposed to evaluation. After media capture device 110 captures a media file, it may store it in local storage 411. Media capture device 110 may also send the media file to local server 120 (directly via transmission 426 or indirectly through gateway 404 via transmissions 422 and 424) and/or to gateway 404 via transmission 422. Local server 120 may then send the media file via transmission 424 to gateway 404. Gateway 404 may provide the user and the network devices with access to one or more external networks, such as external network 140 (e.g. cloud network, the internet, etc.).

After media capture device 110 captures a media file, such as an image or a video, it may need to send the file to an evaluation system. The evaluation system may be located on external server 150, located remotely from a local area network including media capture device 110, local server 120, gateway 404, etc. The media capture device 110 may also need to send the media file to external server 150 for other reasons, such as for external storage to allow access to the file by an external device or network. However, because external server 150 is located remotely from media capture device 110, local server 120, and gateway 404, the media file may need to pass through gateway 404 and/or external network 140 to reach external server 150. This process may take a significant amount of time (e.g. 0.5 seconds, 1 second or multiple seconds) to reach external server 150. Furthermore, this process may consume significant bandwidth within the local area network between media capture device 110, local server 120, and gateway 404. Furthermore, if multiple instructors are attempting to upload/send media files to external server 150 at the same time, and/or there is significant other traffic between media capture device 110, local server 120, and gateway 404, it may be beneficial to delay uploads of media files to external server 150 and/or to the evaluation system. Since the media evidence captured in these media files may be used at a later time to compile an evaluation for a subject (e.g. student, evaluatee, etc.), such a delay (of e.g. 1 hour, several hours, or 1 day) may not take away from the value of such a system. For example, if the system is being used at a school, the network may be most busy between the hours of, for example, 7:30 AM and 3:00 PM. Therefore, transferring/sending media files, some of which may be large in size, through the network at those times may cause latency in the network. Therefore, it may benefit the network to delay the upload/sending of a media file to the external server 150 until after 3:00 PM when school has been dismissed. As noted, media capture device 110 may also send the media file to local server 120 (directly via transmission 426 or indirectly through gateway 404 via transmissions 422 and 424). If school is in session when the media capture device 110 captures, assigns context to, and uploads/sends the media file, it may benefit the network for local server 120 to store for a period of time until school has been dismissed. After school has been dismissed, local server 120 may then send the media file via transmission 424 to gateway 404. Gateway 404 may then send the media file to external server 150 via external network 140.

Local server 120 may implement any number of timing or other schemes to determine when to send a media file 120 to external server 150. For example, local server 120 may send its stored media files to external server 150 every day at a predetermined time after 3:00 PM. Local server 120 may also monitor the local network (including gateway 404 and media capture device 110 and any other devices on the network) and determine when the network has sufficient bandwidth and send the media files to external server 150 based on when the network has sufficient bandwidth to prevent latency in the network.

As discussed herein, media capture devices 110 may include a GUI and media capture device 110 is configured to display the media file to a user on the GUI, display, or other device associated with the media capture device configured to display a file to a user. In FIG. 4, media capture device 110 includes an exemplary GUI 412. GUI 412 may be a touch-screen display, which may be configured to display a picture, video or other media file and may be configured to receive inputs from a user. For example, GUI 412 may be configured to receive inputs from a user to capture media evidence, to enter context for the media evidence, link the media evidence and context to an evaluation system, among other inputs.

As noted, an evaluator (e.g. instructor/teacher) may, after capturing a media file and assigning context to the file, upload the image to an evaluation system immediately or soon after capturing and tagging the image. The evaluator may then not be required to later assign context to the media evidence or upload the evidence into the evaluation system. Furthermore, an evaluator may use the media capture device to capture/tag multiple pieces of media evidence in a row, one after another. Therefore, the evaluator may upload/link the first media file and the first context parameter to the education system (e.g. education profile of the subject of the first file) before capturing the second media file.

Figure 5:
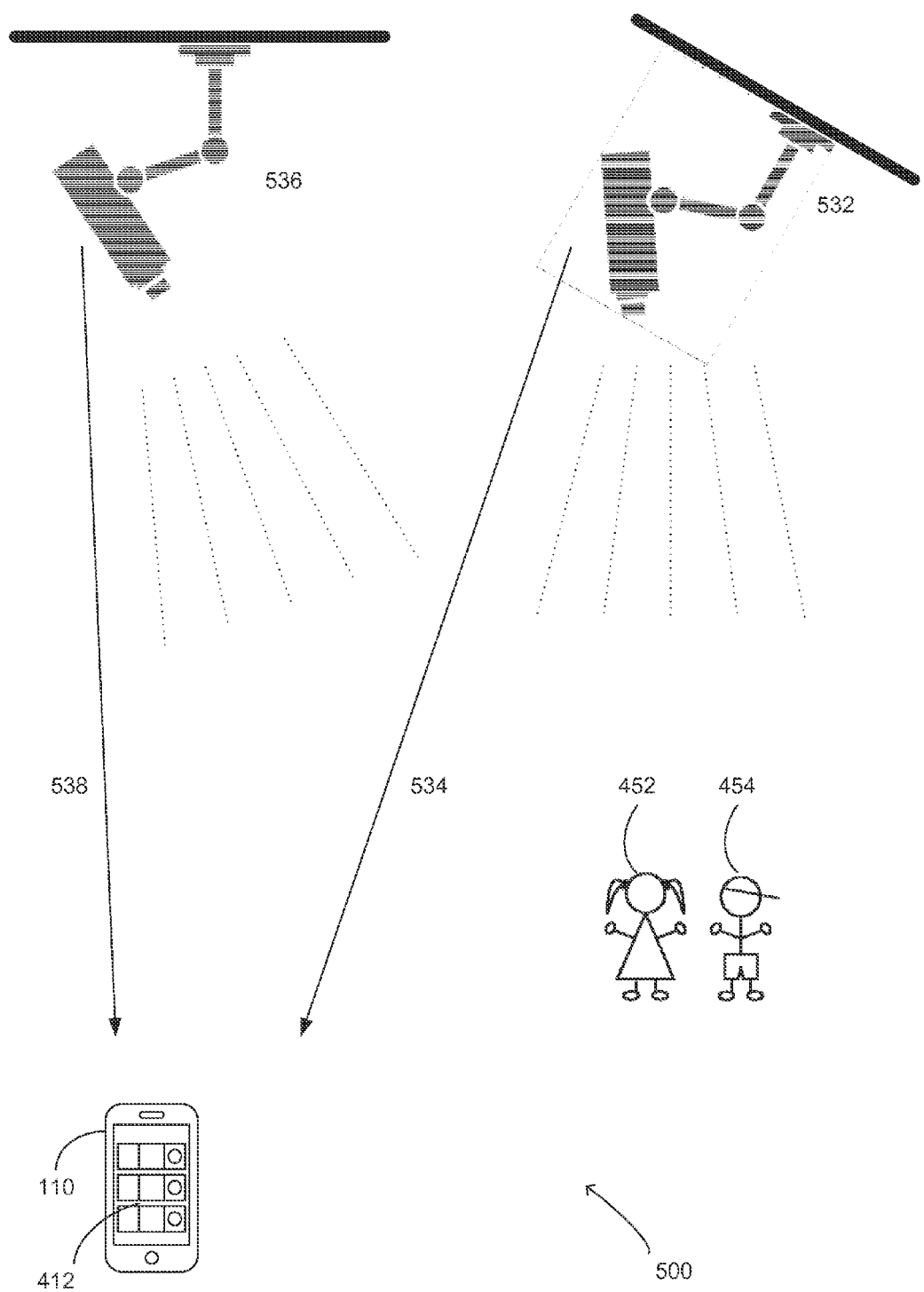
FIG. 5 shows an example of a wireless network including video cameras, according to embodiments of the present invention.

Device 110 may be used in conjunction with a separate device to capture and/or store a media file. For example, device 110 may be used in conjunction with one or more video cameras. FIG. 5 shows an example of a wireless network 500, according to embodiments of the present invention. Network 500 includes media capture devices in the form of video cameras 532 and 536. Video cameras 532 and/or 536 may capture media, such as a video, of one or more subjects, such as subjects 452 and 454. After the video cameras 532 and/or 536 captures a media file, it may store it in storage and send the file to media capture device 110. Video cameras 532 and/or 536 may also stream video directly to media capture device 110 on an ongoing basis. For example, video cameras 532 and/or 536 may be placed at different places in a classroom. Therefore, video cameras 532 and/or 536 may capture video of student subjects from different angles to give the teacher, who may be a user holding media capture device 110, multiple perspectives to choose from when choosing evidence for subjects 452 and 454. While video cameras 532 and/or 536 capture video and live stream that video to media capture device 110, the teacher/instructor may choose specific portions of video from one or more perspectives and/or give context to the evidence as it is captured. The live stream of video may be displayed on display/GUI 412, which will be discussed further with respect to FIG. 11. For example, the instructor may know that a certain event within the classroom is upcoming, and may choose to set the start time of a piece of evidence selected from the live streaming video. However, the instructor may also spontaneously begin a selection of video for use as evidence if the instructor observes the beginning an important piece of evidence. Subsequently, the instructor may end the section of video to be used as evidence at a specified (or spontaneously recognized) time. The instructor may then save, give context to, and/or send the video evidence as described herein with respect to engines 220, 225 and 230 in FIG. 2. Such inputs from the user, including starting and stopping a selection of video to be used as media evidence from a live stream, or any other input from a user, may be received by display 412.

If a separate media capture device, such as a video camera, is used in conjunction with device 110, an engine similar to evidence capture engine 210 and a network interface 205 may instead, or in addition to, be located within the external media capture device. However, device 110 may also include an evidence capture engine 210 that receives a media file or live streaming video from the external capture device and allows the user to select a portion the video or otherwise create a piece of relevant evidence for the evaluation system.

As noted, the instructor may then give context to video evidence captured as a portion of live streaming video received from video cameras 532 and/or 536. To give context to such video evidence, an algorithm may be laid over the top of the streaming video received from video cameras 532 and/or 536 to allow a user to manipulate the streaming video into useful video evidence. For example, the video received from video cameras 532 and/or 536 may be streamed into media capture device 110 within a GUI that includes buttons, tiles, interactive elements, icons, command regions, windows, toolbars, menus, etc., similar to input receiving interface 215 described herein, to allow a user to edit, give context to, or otherwise manipulate the streaming video. Furthermore, the media capture device may be configured to process streaming video to automatically obtain context for the media file. For example, evidence context engine 220 may process captured video to obtain context for the media evidence without input from a user, or independent from any input given by a user, using processes such as such as facial recognition, mood analysis, object recognition, speech recognition, environment detection, among others.

For ease of explanation, the monitoring and control operations discussed below with reference to FIGS. 6-11 are described in the context of an application executing on a media capture device 110 with a touch-screen display/GUI device. However, the operations are not intended to be limited to the exemplary device shown in FIGS. 6-11. It is to be understood that the GUIs illustrated in the exemplary embodiments of FIGS. 6-11 can be readily adapted to be rendered on displays of a variety of computing device platforms running a variety of operating systems.

Figure 6:
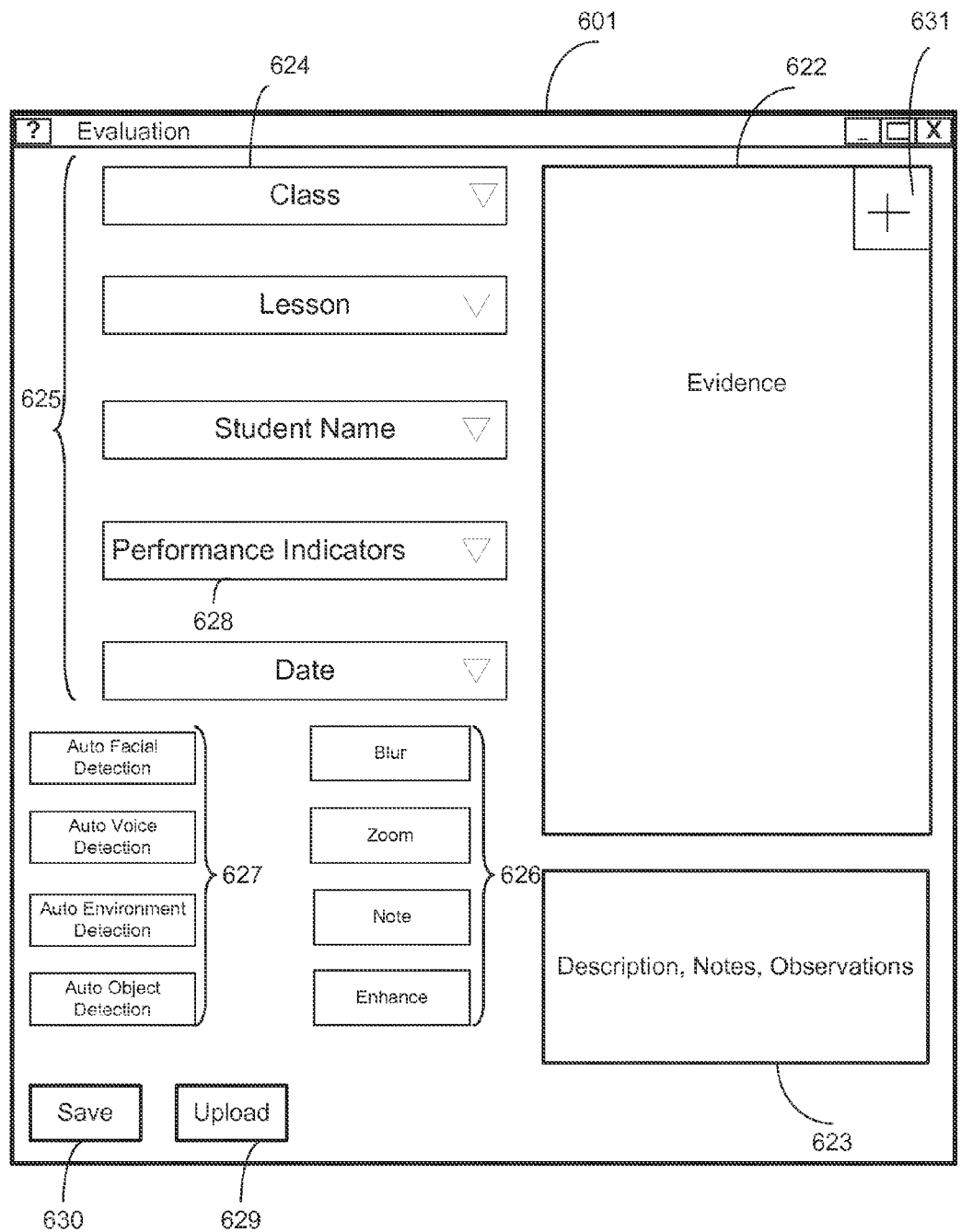
FIG. 6 shows an exemplary GUI for distributing a graphical representation of an evaluation system for linking media evidence and context, according to embodiments of the present invention.

FIG. 6 shows an exemplary GUI for distributing a graphical representation of an evaluation system for linking media evidence and context, according to embodiments of the present invention. For example, FIG. 6 includes a display 601 displayed on a screen associated with a computing device, such as a media capture device, with various graphical icons and other visual indicators that may allow a user of the device to interact with the evaluation system. Display 601 includes an evidence section 622 for capturing and viewing media evidence (e.g. the contents of a media file). Evidence section 622 includes a capture button 631, which allows a user to capture evidence using the media capture device 110. After a user presses capture button 631, the display 601 may present to the user a list of options for capturing media evidence, including but not limited to a picture using a digital camera, a video using a video camera, audio using an audio recorder, among others. After a user selects one of the media evidence capture options, the user may capture a media file/evidence, and the media evidence may be presented to the user either in evidence section 622 on the display 601.

Display 601 may also include various sections for entering context to be associated with the evidence captured in evidence section 622. For example, display 601 in FIG. 6 includes drop down menus 625, which include selections for class (i.e. the class that the evaluator/subject are physically located in for which the evidence in evidence section 622 may be relevant), lesson (i.e. the lesson that the evaluator/subject are participating in for which the evidence in evidence section 622 may be relevant), student name (i.e. name of the subject or subjects who are either captured in the media evidence in evidence section 622 or other subjects for which the evidence may be relevant), performance indicators (i.e. any indicators/evaluation criteria selected by the evaluator that the evaluator deems relevant based on the evidence in evidence section 622 may be relevant), and date, time, or weather or any other file/evidence background information (i.e. the date that the media evidence was captured). However, these drop down menus are only exemplary and a variety of other menus related to metadata or other data/context related to the evidence displayed in evidence section 622 are possible. Furthermore, other types of tiles, interactive elements, icons, command regions, windows, toolbars, menus, and buttons may be used instead of the drop down menus 625 displayed in FIG. 6.

Display 601 also shows other types of context that may be selected and assigned to a media file/evidence. For example, comments section 623 may allow a user to type freehand text into the display to be associated with the evidence captured in evidence section 622. Such freehand text may include a description of the evidence, notes related to the evidence, or other observations made by the evaluator that were not captured in the evidence. Buttons 626 include other various types of context that an evaluator may give to a piece of evidence. For example, an evaluator may blur a face of a subject captured in the evidence so that the face is not visible in a different subject's profile for privacy purposes, may zoom in to or out from the media evidence (e.g. picture), may place a textual note within the media evidence so that a viewer will see the text when viewing the evidence, or may enhance one or more aspects of the evidence by drawing on or otherwise pointing to aspects of the evidence.

Display 601 also includes save button 630 to, for example, save the evidence and associated context (e.g. to media evidence store 250 and/or evidence context store 260 within local server 120, as shown in FIG. 2) for later editing, and upload button 629 to, for example, upload/send the evidence and associated context to an evaluation system (e.g. using evaluation engine 230, as shown in FIG. 2).

Figure 7:
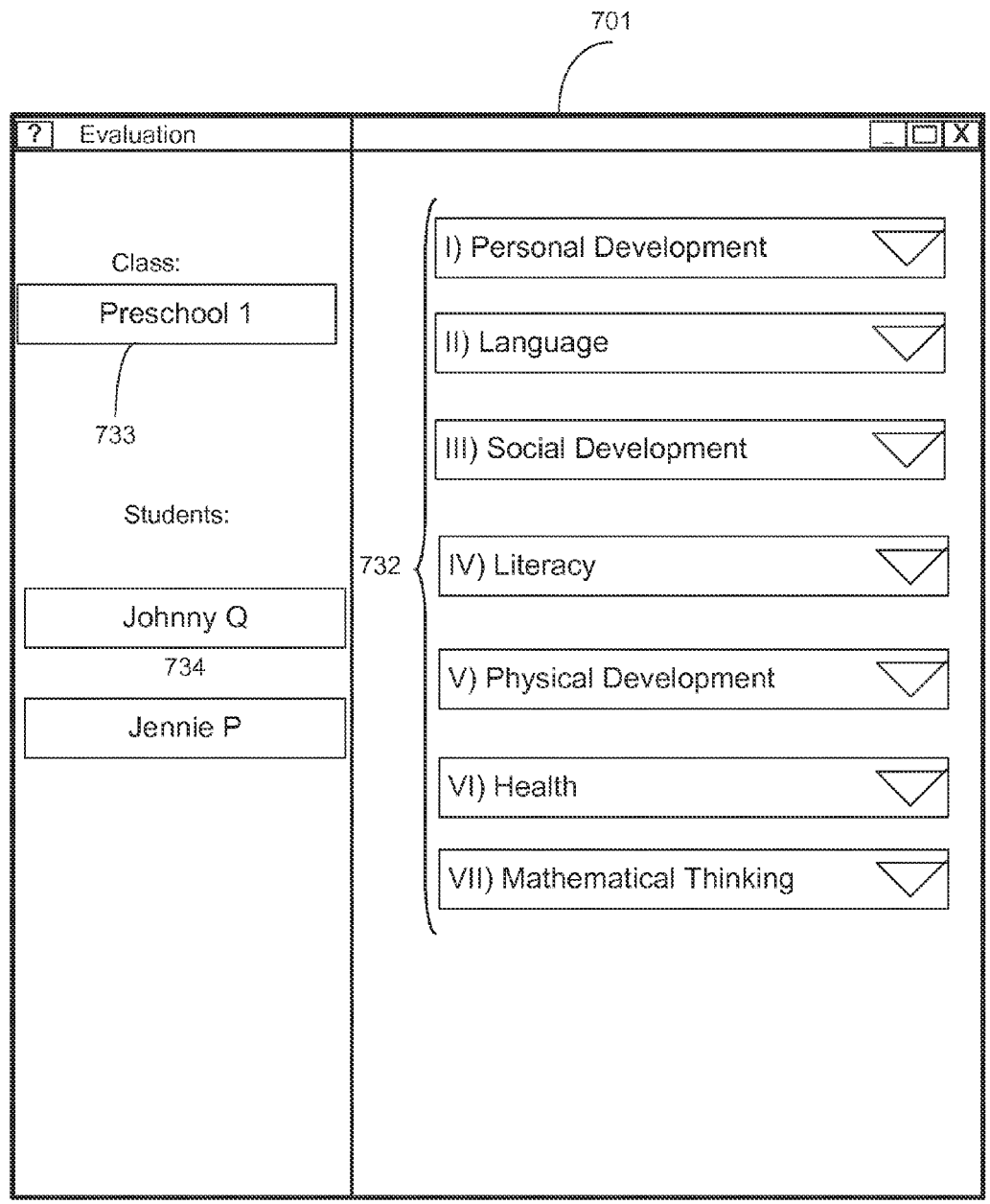
FIG. 7 shows an exemplary GUI for distributing a graphical representation of an evaluation system for linking media evidence to context including performance indicators, according to embodiments of the present invention.

FIG. 7 shows an exemplary GUI for distributing a graphical representation of an evaluation system for linking media evidence to context including performance indicators, according to embodiments of the present invention. For example, FIG. 7 includes an exemplary display with performance indicators 732 that may be presented to the user after the user selects one or more performance indicators from drop down 628 in FIG. 6. For example, display 701 includes exemplary performance indicators/domains (shown here as drop down menus) "personal development", "language", "social development", "literacy", "physical development", "health", and "mathematical thinking". However, these drop down menus are only exemplary and a variety of other options including metadata or other data/context related to the performance of a subject are possible. For example, other indicators may include physical development and health, social and emotional development, approaches to learning, logic and reasoning, language development, literacy knowledge and skills, mathematics knowledge and skills, science knowledge and skills, creative arts expression, social studies knowledge and skills, english language development, among others. Furthermore, other types of tiles, interactive elements, icons, command regions, windows, toolbars, menus, and buttons may be used instead of the drop down menus 732 displayed in FIG. 7.

Because performance indicators 732 may be presented to the user after the user selects one or more performance indicators from drop down 628 in FIG. 6, the performance indicator tags shown as options of performance indicators 732 may be viewed as sub-tags giving context to evidence captured and displayed in evidence section 622. In other words, such indicators give further detailed context than a more broad performance indicator presented to and selected by a user at the performance indicators drop down menu 628 in display 601. As such, the context associated with a given piece of evidence may comprise several different levels of detail based on the evaluation system that the evaluator is working with and based on the selections that the evaluator makes within that system. On the other hand, some selections may be the only one or last in a line of selections/levels of context. For example, display 701 also shows already selected class 733 ("preschool 1") and students 734 ("Johnny Q" and "Jennie P").

Figure 8:
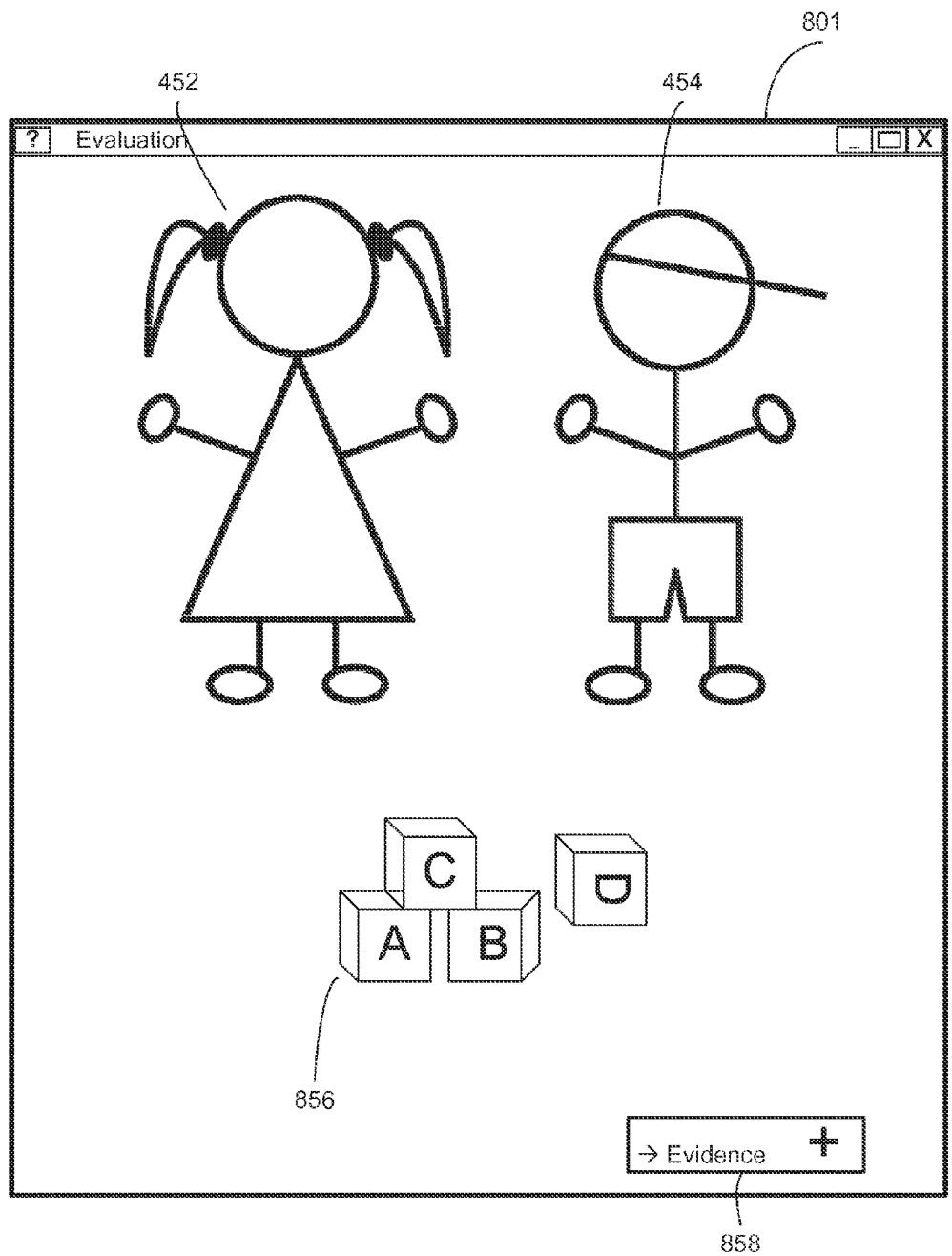
FIG. 8 shows an exemplary GUI/display 801 for distributing a graphical representation of an exemplary form of evidence (i.e. a picture) captured by a media capture device, according to embodiments of the present invention.

FIG. 8 shows an exemplary GUI/display 801 for distributing a graphical representation of an exemplary form of evidence (i.e. a picture) captured by a media capture device 110, according to embodiments of the present invention. More specifically, display 801 shows a representation of a picture taken by a media capture device, including subjects 452 and 454, blocks 856 and file/evidence upload section/button 858, but not within the context of an evaluation system. Instead, after a picture or other media evidence has been captured by a media capture device 110, a user may be offered the option to connect/link the media evidence to the evaluation system by pressing on button 858. Thereafter, the user may be presented with various options for linking the picture to the evaluation system, such as a list of portions of the evaluation system to which the user would like to link the evidence and/or various types of context as described herein. For example, a piece of media evidence may be directly linked to a specific subject profile based on the subjects in the picture or for which a subject may be relevant, or may be presented to the user within the evaluation system in, for example, evidence section 622 as shown in FIG. 6 so that different types of context may be presented to the user for linking to the media evidence before uploading to the evaluation system.

Figure 9:
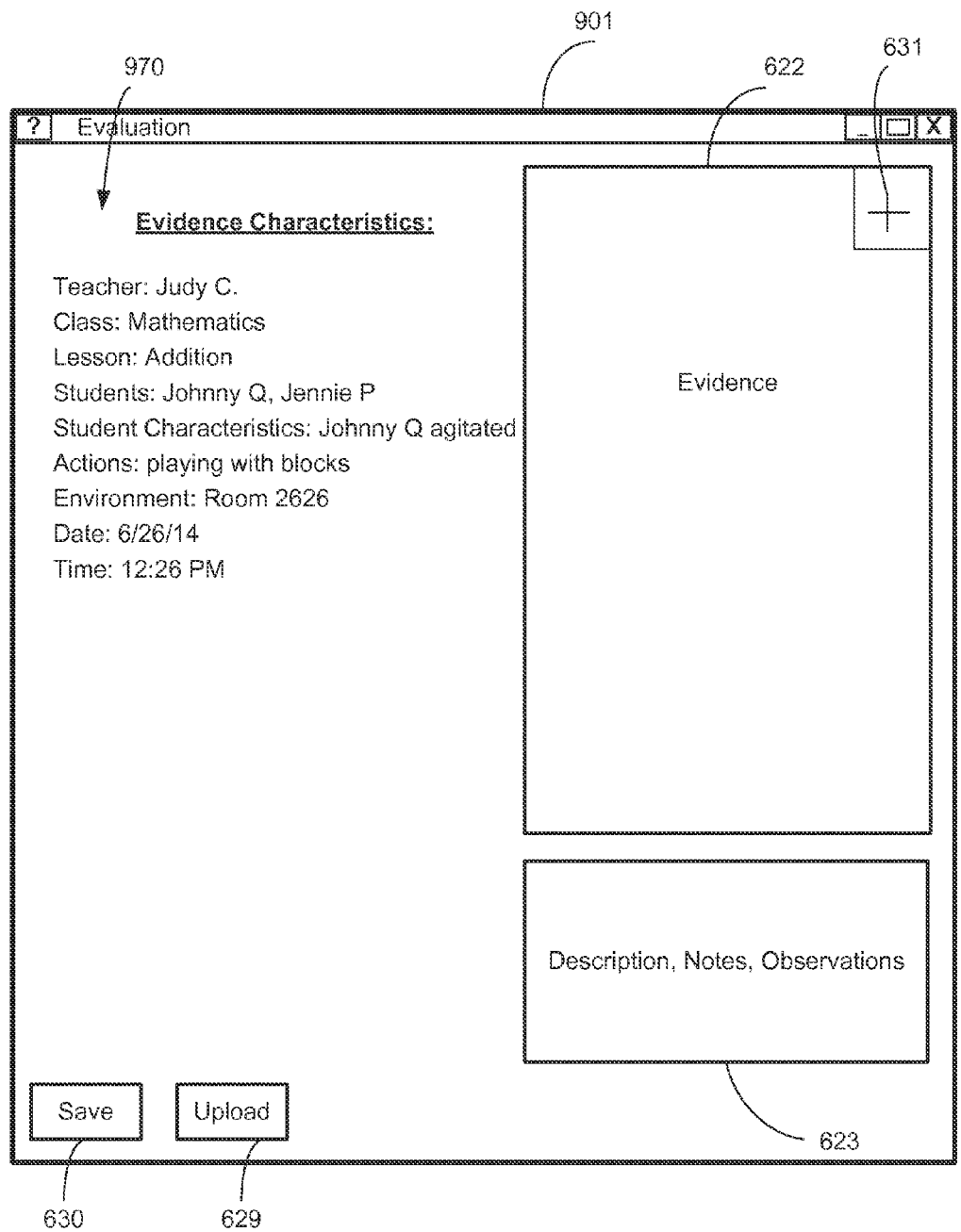
FIG. 9 shows an exemplary GUI for distributing a graphical representation of an evaluation system for linking a media file/evidence and automatically captured/generated context, according to embodiments of the present invention.

FIG. 9 shows an exemplary GUI for distributing a graphical representation of an evaluation system for linking a media file/evidence and automatically captured/generated context, according to embodiments of the present invention. For example, FIG. 9 includes a display 801 displayed on a screen associated with a computing device, such as a media capture device, with various graphical icons and other visual indicators that may allow a user of the device to interact with the evaluation system. Display 901 includes, similar to FIG. 6, an evidence section 622 for capturing and viewing media evidence. Evidence section 622 includes a capture button 631, which allows a user to capture evidence using the media capture device 110. Display 601 may also include various sections including context associated with the evidence captured in evidence section 622. However, different than as shown in FIG. 6, display 601 may include evidence context characteristics/parameters 970 that have been automatically captured/generated without user input. For example, instead of displaying options on a display for the user to choose from and/or enter, such as a student name, the system has discovered that certain students (Johnny Q and Jennie P) are captured in the media evidence captured by the media capture device 601. While the user may edit the discovered subject names, the user may decide not to edit them if they were discovered correctly. Such automatically discovered context parameters may be captured using facial recognition. Various other types of automatic systems/engines may be used to automatically discover different context parameters, including, mood analysis engine, object recognition engine, speech recognition engine, speech tone analysis engine, and environment detection engine, and others discussed with respect to evidence context engine 220 in FIG. 2. However, as noted, these engines are only exemplary and are not meant to limit the possible engines that could be included within evidence context engine 220. As shown in FIG. 9, various evidence characteristics may be automatically discovered using these processes/engines, including the date/time the media file/evidence was captured, the room location where the evidence was captured, the class during which the evidence was captured, the teacher (or other evaluator) that captured the evidence, among many others shown in FIG. 9 and not shown in FIG. 9.

Although FIGS. 6 and 9 are shown with manually entered context parameters and automatically discovered context parameters, respectively, manually entered and automatically discovered context parameters may be mixed in a variety of ways within one example evaluation system and/or with respect to a given piece of media evidence. For example, certain parameters may be automatically discovered by the evaluation system or other engine on media capture device 110, while other parameters related to the same media evidence may be prompted for by the media capture device and entered by a user. For example, comments section 623 may be manually prompted for, while the date/time may be automatically captured. Furthermore, a certain type of parameter may be manually entered or automatically entered for different types of media evidence and for different examples of any specific type of media evidence, depending on the circumstances and the type of media evidence.

Figure 10:
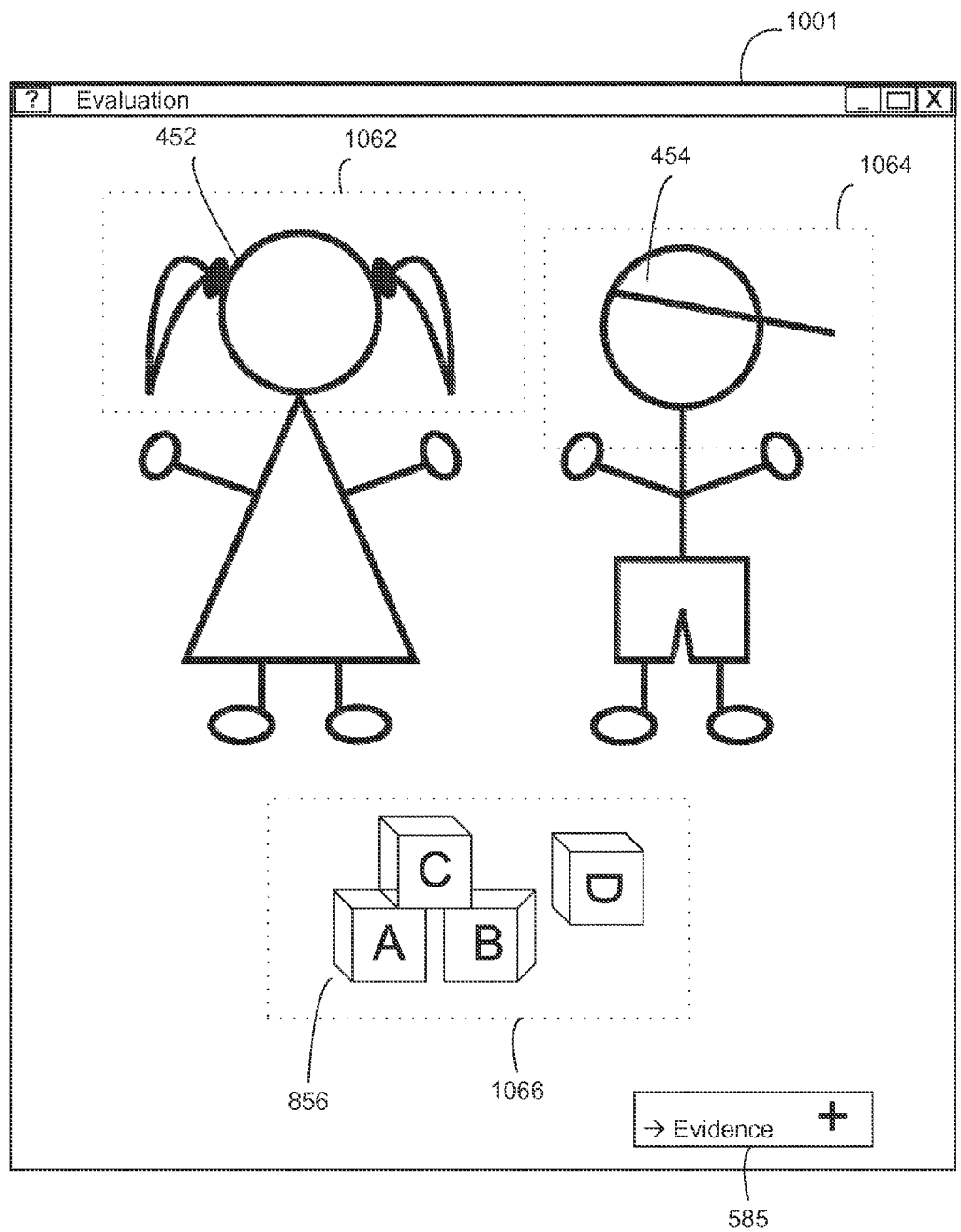
FIG. 10 shows an exemplary GUI/display for distributing a graphical representation of an exemplary form of evidence (i.e. a picture) captured by a media capture device during automatic context recognition, according to embodiments of the present invention.

FIG. 10 shows an exemplary GUI/display 1001 for distributing a graphical representation of an exemplary form of evidence (i.e. a picture) captured by a media capture device 110 during automatic context recognition, according to embodiments of the present invention. More specifically, display 1001 shows a representation of a picture taken by a media capture device, including subjects 452 and 454 while, for example, facial recognition is in progress to determine context including determining, for example, subject and object identifications. As noted, facial recognition engine 340 discussed with regard to FIG. 3 is configured to process a captured media file, for example a picture, and determine which subjects are captured in the media evidence based on the faces captured in the picture. Therefore, facial recognition may allow for the automatic determination of the names of the subjects captured in the media evidence so that the user does not have to separately input that information as context. Similarly, as noted, the object recognition engine 344 discussed with regard to FIG. 3 may determine what objects are in a captured picture based on the shape(s) of the objects, any text written on the objects, the nature of any actions being taken with the objects, among others. Therefore, object recognition may allow for the automatic determination of which objects are located in a piece of media evidence so that the user does not have to separately input that information as context.

FIG. 10 also includes boxes 1062, 1064 and 1066 that represent the recognition of faces and objects for determining the identification of those faces and objects as generated by, for example, facial recognition engine 340 and object recognition engine 344, respectively. However, such engines/processes may automatically recognize evidence to assign context to the evidence without displaying boxes 1062, 1064 and 1066, or anything at all. Furthermore, other forms of automatic detection of context (e.g. environment recognition) may be performed in a similar process.

Figure 11:
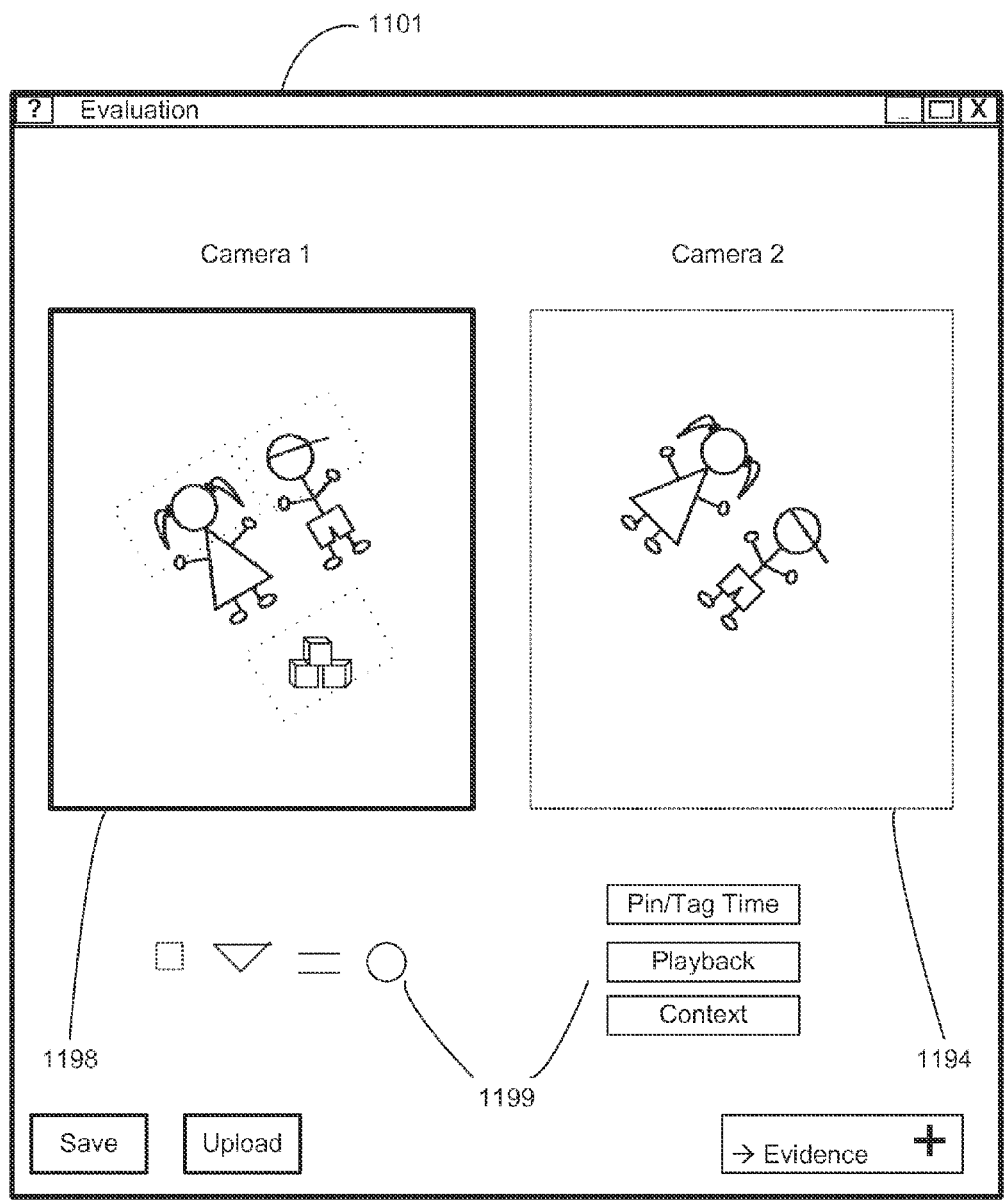
FIG. 11 shows an exemplary GUI/display for distributing a graphical representation of an exemplary form of evidence captured by a media capture device, according to embodiments of the present invention.

FIG. 11 shows an exemplary GUI/display 1101 for distributing a graphical representation of an exemplary form of evidence (i.e. one or multiple videos) captured by a media capture device 110, according to embodiments of the present invention. More specifically, display 1101 shows a representation of videos taken by media capture devices, such as video cameras, including subjects 452 and 454. As shown in FIG. 11, display 1101 includes a display/graphical representation 1198 of video (e.g. live video stream) received from video camera 1 and a display/graphical representation 1194 of video (e.g. live video stream) received from video camera 2. Display 1101 may be similar to display 412 as shown in FIG. 5. As shown in FIG. 5, the split displays 1198 and 1194 may represent different video cameras placed in different portions of the same room, such as a classroom, and configured to capture video of subjects 452 and 454 at different angles or from different perspectives.

Display 1101 also shows control devices 1199, including stop, play, pause, record, pin/tag time and playback buttons. Control devices 1199 allow a user to control video streams, such as live video streams, received from two video cameras. For example, an instructor may select a certain portion of a certain one or both of the cameras as evidence to be associated with certain subjects within the evaluation system by pressing the "Pin/Tag Time" button. The instructor may know that a certain event within the classroom is upcoming, and may choose to set the start time of a piece of evidence selected from the live streaming video. However, the instructor may also spontaneously begin a selection of video for use as evidence if the instructor observes the beginning an important piece of evidence. Subsequently, the instructor may end the section of video to be used as evidence at a specified (or spontaneously recognized) time by pressing the "Pin/Tag Time" button again. The instructor may then save, give context to, and/or send the video evidence as described herein. For example, a user may press one of buttons 1199, the "Context" button, that may, for example, provide the user with various options for giving context to the selected video evidence (such as, for example, display 701 in FIG. 7 or display 901 in FIG. 9), may provide the user with a separate screen for providing context (such as, for example, display 601 in FIG. 6), among various other possibilities.

Figure 12:
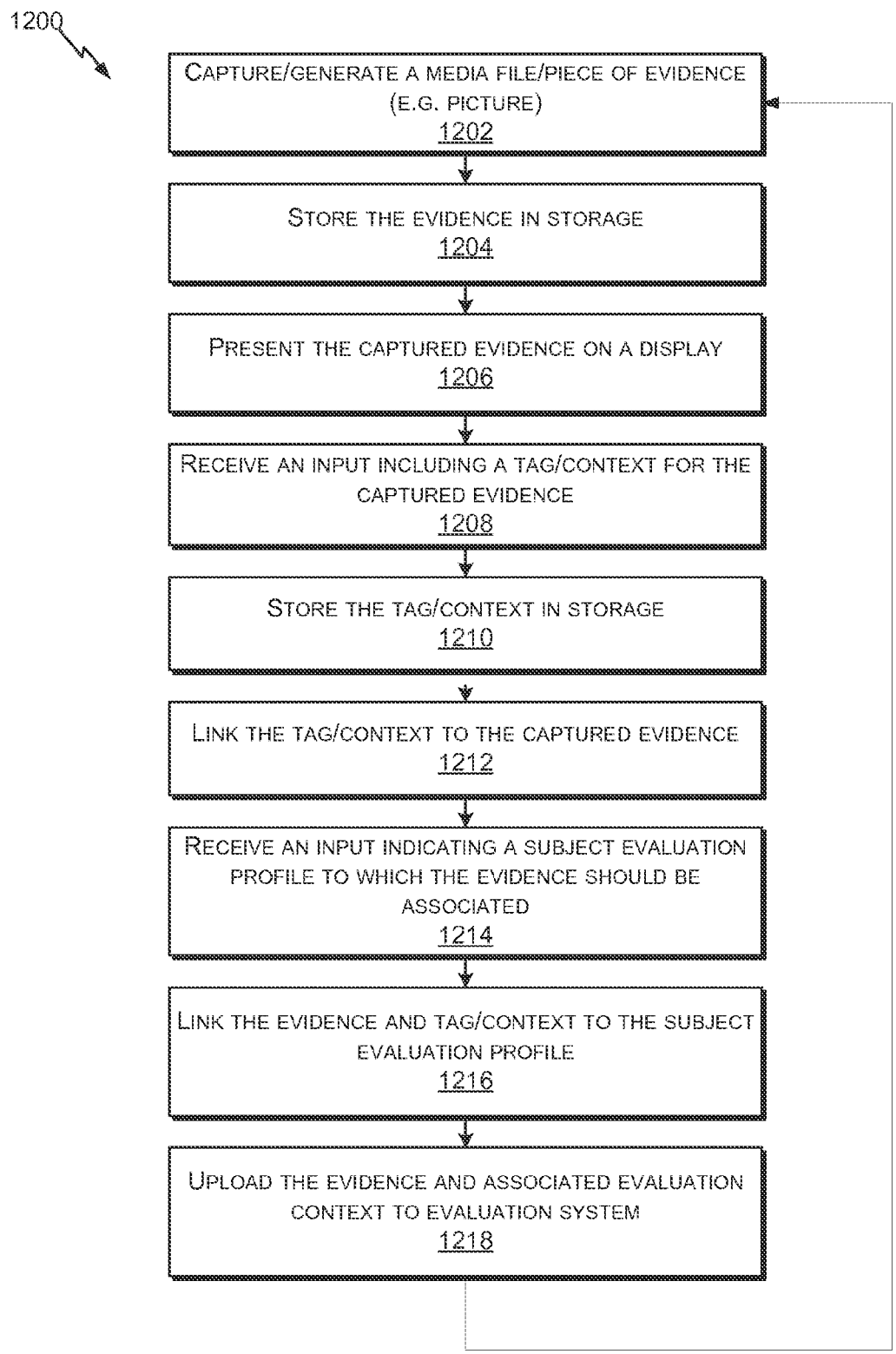
FIG. 12 shows a flowchart illustrating a process for capturing and tagging media evidence for an evaluation system used to evaluate a subject, according to embodiments of the present invention.

FIG. 12 shows a flowchart illustrating a process 1200 for capturing and tagging media evidence for an evaluation system used to evaluate a subject, according to embodiments of the present invention. Step 1202 includes capturing/generating a media file or piece of media evidence (e.g. a picture or video). For example, this step may be taken by a media capture device, such as media capture device 110, in response to an input from a user. A media file/evidence may be captured for the purpose of being uploaded into the evaluation system, or a previously captured media file may be uploaded after being previously captured. In step 1204, the media capture device may store the evidence in storage. For example, the evidence/file may be stored in storage within the media capture device, on a local server, or on an external server, among other possibilities. In step 1206, the media capture device sends/presents the captured file/evidence to the user on the media capture device or on an external display. For example, the evidence may be presented to the user on a GUI, touch screen, etc. as discussed herein.

In step 1208, the media capture device may receive an input including a tag/context for the captured file/evidence. For example, a user may select one of a list of predetermined tags within one or more of several different categories of tags to give the evidence context. Furthermore, a user may input non-predetermined context in the form of text, editing, or any other context that adds value to the evidence for the purpose of being useful for a subject evaluation. For example, a variety of exemplary contexts are described herein with respect to FIG. 6. In step 1210, the media capture device may store the tag/context in storage, and then in step 1212 may link the tag/context to the captured evidence. For example, this step allows for the context/tags associated with the evidence to be sent with the evidence when uploaded to the evaluation system.

In step 1214, the media capture device may receive an input indicating a subject evaluation profile to which the evidence (and its associated context/tags) should be associated. For example, a user may indicate that a piece of evidence should be associated with Johnny Q and Jennie P's profiles (e.g. as shown in FIG. 7). Therefore, the captured media evidence may be associated with those profiles based on the user input. In step 1216, the media evidence and its associated context/tags may be linked to the indicated profiles.

In step 1218, the media capture device may upload the evidence and its associated evaluation context to the evaluation system. For example, the evaluation system may be stored on the media capture device itself, on a local server, on an external server, or elsewhere. After the media file/evidence and its associated context has been uploaded to the evaluation system, the media capture device may capture a new piece of evidence (and start again at step 1202).

Although the above process 1200 was described with respect to being performed by a media capture device, various other devices may perform these steps (e.g. a local or external server or other device).

Figure 13:
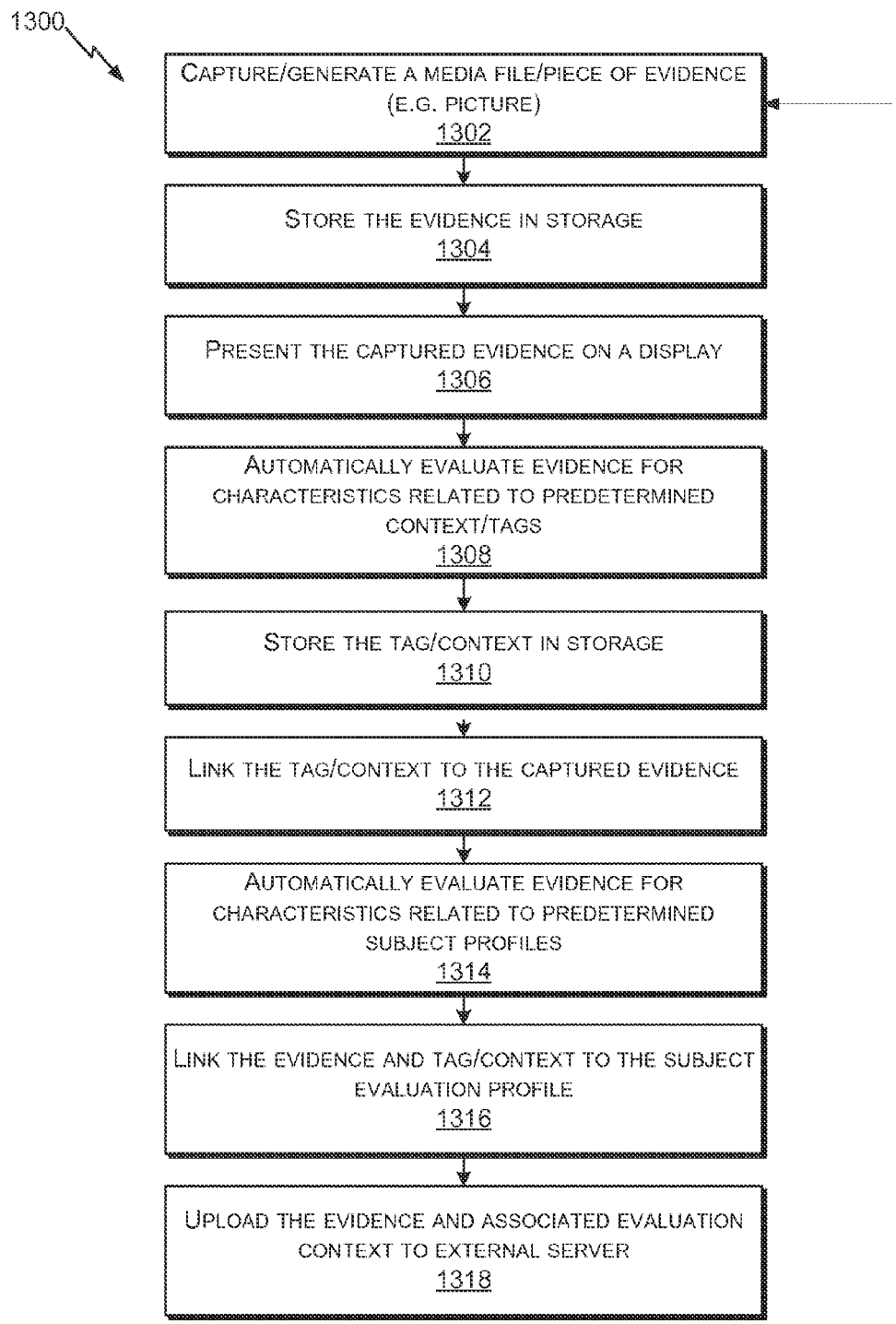
FIG. 13 shows a flowchart illustrating a process for capturing and tagging media evidence for an evaluation system used to evaluate a subject including automatically discovered context/tags, according to embodiments of the present invention.

FIG. 13 shows a flowchart illustrating a process 1300 for capturing and tagging media evidence for an evaluation system used to evaluate a subject including automatically discovered context/tags, according to embodiments of the present invention. Process 1300 is substantially similar to process 1200 shown in FIG. 12, except for steps 1308 and 1314. Step 1308 includes automatically evaluating evidence for characteristics related to predetermined context/tags. In other words, in step 1308 the media capture device automatically processes the media evidence to discover characteristics about the media file itself and/or the content of the media evidence within the file that may associate context tags with the file/evidence. For example, the media capture device may automatically assign a date and/or time to the file based on when the media file was captured. As another example, the media capture device may use recognition to determine subjects or objects captured within the content of the media evidence and/or other characteristics of the media evidence. This process is described further with respect to, for example, FIGS. 3 and 9.

Step 1314 includes automatically evaluating evidence for characteristics related to predetermined subject profiles. In other words, in step 1314 the media capture device automatically processes the media evidence to discover which subject profiles the evidence should be associated with. Thereafter, the media capture device may present that information to the user on a display. This step may relieve the user from the step of actively selecting one or more user profiles or other profiles to which the captured and tagged evidence should be associated.

Although the above process 1300 was described with respect to being performed by a media capture device, various other devices may perform these steps (e.g. a local or external server or other device).

Figure 14:
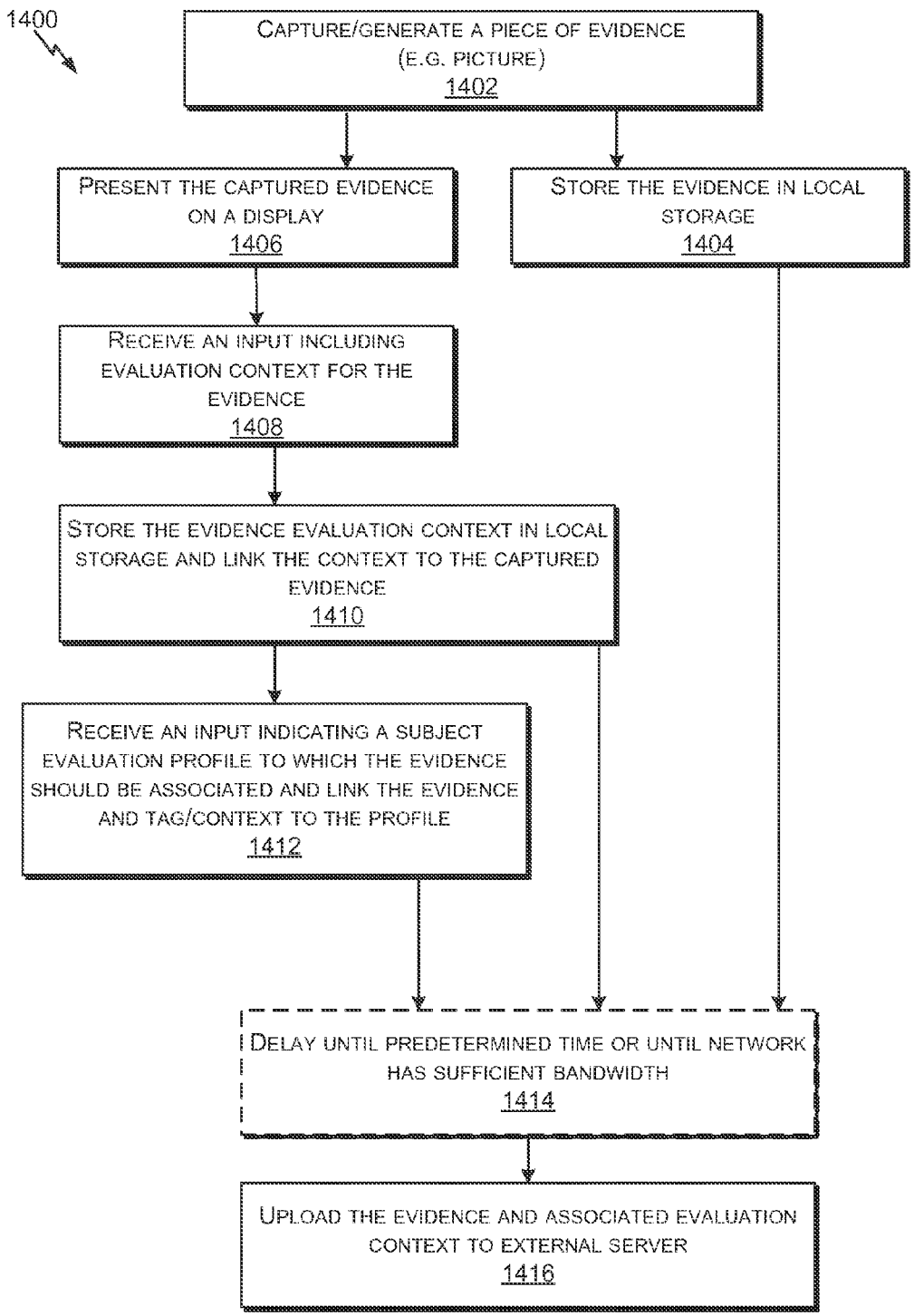
FIG. 14 shows a flowchart illustrating a process for capturing and tagging media evidence for an evaluation system and uploading that captured/tagged evidence to the system, according to embodiments of the present invention.

FIG. 14 shows a flowchart illustrating a process 1400 for capturing and tagging media evidence for an evaluation system and uploading that captured/tagged evidence to the system, according to embodiments of the present invention. Process 1400 is substantially similar to process 1200 shown in FIG. 12, except for step 1414. Step 1414 includes a delay between steps 1404, 1410 and 1412 before uploading the evidence and associated evaluation context to, for example, an external server. More specifically, step 1414 includes such a delay until a predetermined amount of time has passed, a predetermined time of day has occurred, or until the network through which the evidence would have to travel has sufficient bandwidth. For example, since the media files may be used at a later time to compile an evaluation for a subject (e.g. student, evaluatee, etc.), such a delay (of e.g. 1 hour, several hours, or 1 day) may not take away from the value of such a system. And, if the system is being used at a school, the network may be most busy (and with the least amount of bandwidth available) between the hours of, for example, 7:30 AM and 3:00 PM.

Although the above process 1400 was described with respect to being performed by a media capture device, various other devices may perform these steps (e.g. a local or external server or other device).

Figure 15:
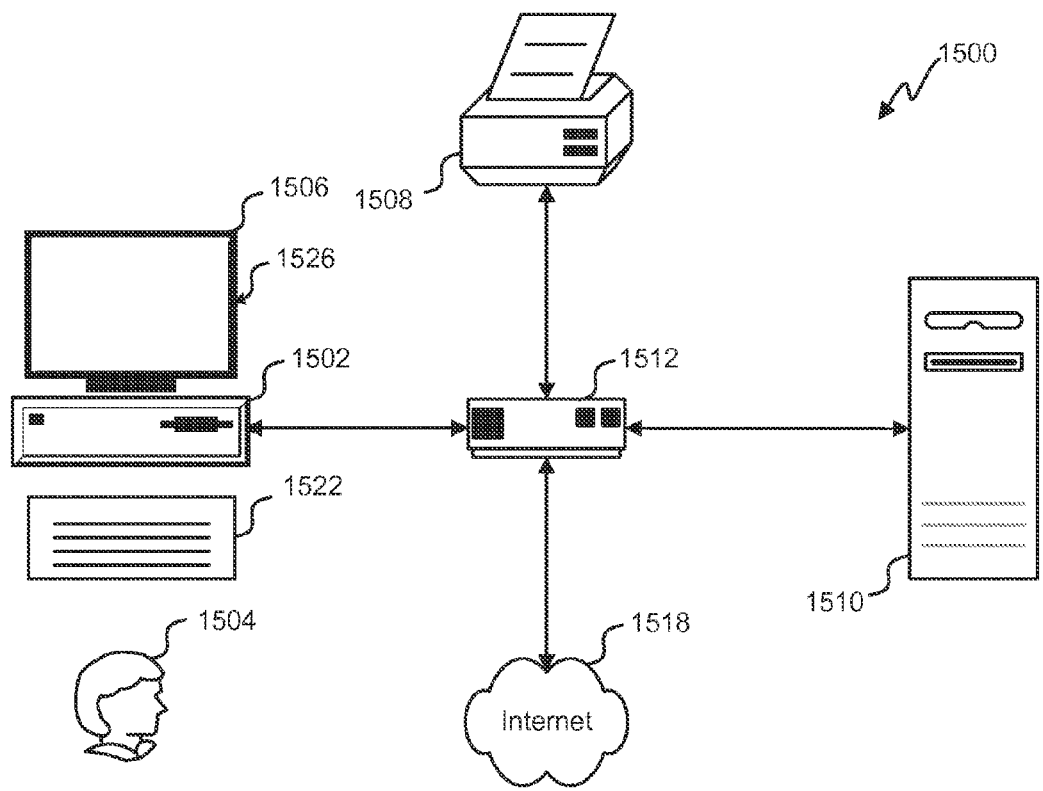
FIG. 15 shows an example environment for illustrating a process for capturing and tagging media evidence for an evaluation system and uploading that captured/tagged evidence to the system, according to embodiments of the present invention.

Referring next to FIG. 15, an exemplary environment with which embodiments may be implemented is shown with a computer system 1500 that can be used by a designer 1504 to design, for example, electronic designs. The computer system 1500 can include a computer 1502, keyboard 1522, a network router 1512, a printer 1508, and a monitor 1506. The monitor 1506, processor 1502 and keyboard 1522 are part of a computer system 1526, which can be a laptop computer, desktop computer, handheld computer, mainframe computer, etc. The monitor 1506 can be a CRT, flat screen, etc.

A designer 1504 can input commands into the computer 1502 using various input devices, such as a mouse, keyboard 1522, track ball, touch screen, etc. If the computer system 1500 comprises a mainframe, a designer 1504 can access the computer 1502 using, for example, a terminal or terminal interface. Additionally, the computer system 1526 may be connected to a printer 1508 and a server 1510 using a network router 1512, which may connect to the Internet 1518 or a WAN.

The server 1510 may, for example, be used to store additional software programs and data. In one embodiment, software implementing the systems and methods described herein can be stored on a storage medium in the server 1510. Thus, the software can be run from the storage medium in the server 1510. In another embodiment, software implementing the systems and methods described herein can be stored on a storage medium in the computer 1502. Thus, the software can be run from the storage medium in the computer system 1526. Therefore, in this embodiment, the software can be used whether or not computer 1502 is connected to network router 1512. Printer 1508 may be connected directly to computer 1502, in which case, the computer system 1526 can print whether or not it is connected to network router 1512.

Figure 16:
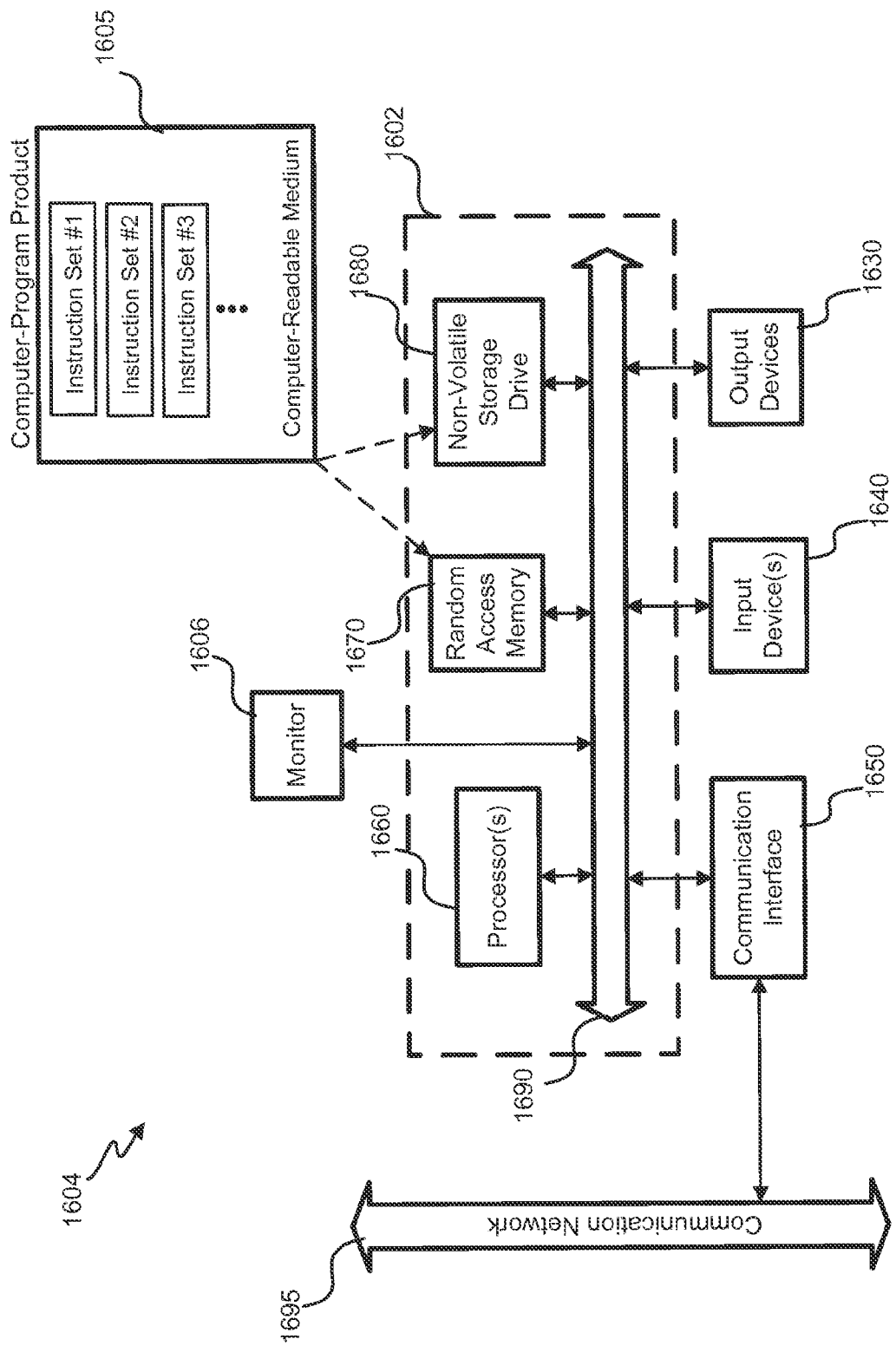
FIG. 16 shows an example special-purpose computer system, according to embodiments of the present invention.

With reference to FIG. 16, an embodiment of a special-purpose computer system 104 is shown. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system 1526, it is transformed into the special-purpose computer system 104.

Special-purpose computer system 104 comprises a computer 1502, a monitor 1506 coupled to computer 1502, one or more additional user output devices 1630 (optional) coupled to computer 1502, one or more user input devices 1640 (e.g., keyboard, mouse, track ball, touch screen) coupled to computer 1502, an optional communications interface 1650 coupled to computer 1502, a computer-program product 1605 stored in a tangible computer-readable memory in computer 1502. Computer-program product 1605 directs system 104 to perform the above-described methods. Computer 1502 may include one or more processors 1660 that communicate with a number of peripheral devices via a bus subsystem 1690. These peripheral devices may include user output device(s) 1630, user input device(s) 1640, communications interface 1650, and a storage subsystem, such as random access memory (RAM) 1670 and non-volatile storage drive 1680 (e.g., disk drive, optical drive, solid state drive), which are forms of tangible computer-readable memory.

Computer-program product 1605 may be stored in non-volatile storage drive 1680 or another computer-readable medium accessible to computer 1502 and loaded into memory 1670. Each processor 1660 may comprise a microprocessor, such as a microprocessor from Intel® or Advanced Micro Devices, Inc.®, or the like. To support computer-program product 1605, the computer 1502 runs an operating system that handles the communications of product 1605 with the above-noted components, as well as the communications between the above-noted components in support of the computer-program product 1605. Exemplary operating systems include Windows® or the like from Microsoft® Corporation, Solaris® from Oracle®, LINUX, UNIX, and the like.

User input devices 1640 include all possible types of devices and mechanisms to input information to computer system 1502. These may include a keyboard, a keypad, a mouse, a scanner, a digital drawing pad, a touch screen incorporated into the display, audio input devices such as voice recognition systems, microphones, and other types of input devices. In various embodiments, user input devices 1640 are typically embodied as a computer mouse, a trackball, a track pad, a joystick, wireless remote, a drawing tablet, a voice command system. User input devices 1640 typically allow a user to select objects, icons, text and the like that appear on the monitor 1506 via a command such as a click of a button or the like. User output devices 1630 include all possible types of devices and mechanisms to output information from computer 1502. These may include a display (e.g., monitor 1506), printers, non-visual displays such as audio output devices, etc.

Communications interface 1650 provides an interface to other communication networks and devices and may serve as an interface to receive data from and transmit data to other systems, WANs and/or the Internet 1518. Embodiments of communications interface 1650 typically include an Ethernet card, a modem (telephone, satellite, cable, ISDN), a (asynchronous) digital subscriber line (DSL) unit, a FireWire interface, a USB interface, a wireless network adapter, and the like. For example, communications interface 1650 may be coupled to a computer network, to a FireWire® bus, or the like. In other embodiments, communications interface 1650 may be physically integrated on the motherboard of computer 1502, and/or may be a software program, or the like.

RAM 1670 and non-volatile storage drive 1680 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 1670 and non-volatile storage drive 1680 may be configured to store the basic programming and data constructs that provide the functionality of various embodiments of the present invention, as described above.

Software instruction sets that provide the functionality of the present invention may be stored in RAM 1670 and non-volatile storage drive 1680. These instruction sets or code may be executed by the processor(s) 1660. RAM 1670 and non-volatile storage drive 1680 may also provide a repository to store data and data structures used in accordance with the present invention. RAM 1670 and non-volatile storage drive 1680 may include a number of memories including a main random access memory (RAM) to store of instructions and data during program execution and a read-only memory (ROM) in which fixed instructions are stored. RAM 1670 and non-volatile storage drive 1680 may include a file storage subsystem providing persistent (non-volatile) storage of program and/or data files. RAM 1670 and non-volatile storage drive 1680 may also include removable storage systems, such as removable flash memory.

Bus subsystem 1690 provides a mechanism to allow the various components and subsystems of computer 1502 communicate with each other as intended. Although bus subsystem 1690 is shown schematically as a single bus, alternative embodiments of the bus subsystem may utilize multiple busses or communication paths within the computer 1502.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A method for generating media files and context parameters and linking the media files and context parameters to subject profiles during evaluation of a subject, the method comprising:

receiving, at media capture device on a network, a first input from an evaluator to capture a first media file;

capturing, at the media capture device, the first media file responsive to the evaluator's first input;

storing the first media file;

receiving, at the media capture device, a second input from the evaluator to capture a second media file;

capturing, at the media capture device, the second media file responsive to the evaluator's second input;

storing the second media file;

receiving, at the media capture device, a third input from the evaluator indicating a first context parameter;

tagging the first media file with the first context parameter;

storing the first context parameter;

receiving, at the media capture device, a fourth input from the evaluator indicating a second context parameter;

tagging the second media file with the second context parameter;

storing the second context parameter;

receiving, at the media capture device, a fifth input from the evaluator indicating a first subject parameter for an education profile of the first subject;

linking the first media file and the first context parameter to the education profile of the first subject based on the first subject parameter;

receiving, at the media capture device, a sixth input from the evaluator indicating a second subject parameter for an education profile of the second subject;

linking the second media file and the second context parameter to the education profile of the second subject based on the second subject parameter;

determining that an available bandwidth on the network is below a threshold bandwidth for transmitting the first media file and second media file to an evaluation system;

monitoring the network to determine when the available bandwidth on the network rises above the threshold;

determining that the available bandwidth is above the threshold; and transmitting, from the media capture device, the first media file and the second media file to the evaluation system on an external server, wherein the evaluation system is configured to display education profiles and media files the evaluator.

2. The educational evidence and evaluation system for generating media files and context parameters and linking the media files and context parameters to education profiles during evaluation of a subject of claim 1, further comprising linking the first media file and the first context parameter to the education profile of the first subject based on the first subject parameter before receiving the second input from the evaluator to capture the second media file.

3. The educational evidence and evaluation system for generating media files and context parameters and linking the media files and context parameters to education profiles during evaluation of a subject of claim 1, wherein the first media file and the second media file are selected from the group of: an image file, a video file, and an audio file.

4. The educational evidence and evaluation system for generating media files and context parameters and linking the media files and context parameters to education profiles during evaluation of a subject of claim 3, wherein the first context parameter indicates a characteristic of the first media file.

5. The educational evidence and evaluation system for generating media files and context parameters and linking the media files and context parameters to education profiles during evaluation of a subject of claim 3, wherein the first context parameter indicates a characteristic of the content of the first media file.

6. The method of claim 1, wherein the threshold bandwidth is a predetermined bandwidth, wherein the predetermined bandwidth is a minimum amount of bandwidth that allows the first media file and second media file to be transmitted to the evaluation system in a certain amount of time.

7. The method of claim 1, further comprising:
determining the threshold bandwidth based on a measured latency of a file being transmitted through the network.

8. The method of claim 1, further comprising:
determining the threshold bandwidth using an educational calendar to determine when a school day for the evaluator is completed.

9. The method of claim 1, wherein the available bandwidth is determined periodically over a period of time.

10. The method of claim 1, further comprising:
transmitting the first media file and the second media file to a display device, wherein the display device is configured to display the education profile of the first subject with the first media file and the education profile of the second subject with the second media file.

11. A non-transitory computer-readable storage medium having instructions stored thereon, which when executed by a computing device, cause the computing device to perform operations comprising:

receiving, at the media capture device, a first input from an evaluator to capture a first media file;

capturing, at the media capture device, the first media file responsive to the evaluator's first input;

storing the first media file;

receiving, at the media capture device, a second input from the evaluator to capture a second media file;

capturing, at the media capture device, the second media file responsive to the evaluator's second input;

storing the second media file;

receiving, at the media capture device, a third input from the evaluator indicating a first context parameter;

tagging the first media file with the first context parameter;

storing the first context parameter;

receiving, at the media capture device, a fourth input from the evaluator indicating a second context parameter;

tagging the second media file with the second context parameter;

storing the second context parameter;

receiving, at the media capture device, a fifth input from the evaluator indicating a first subject parameter for an education profile of the first subject;

linking the first media file and the first context parameter to the education profile of the first subject based on the first subject parameter;

receiving, at the media capture device, a sixth input from the evaluator indicating a second subject parameter for an education profile of the second subject;

linking the second media file and the second context parameter to the education profile of the second subject based on the second subject parameter;

determining that an available bandwidth on the network is below a threshold bandwidth for transmitting the first media file and second media file to an evaluation system;

monitoring the network to determine when the available bandwidth on the network rises above the threshold;

determining that the available bandwidth is above the threshold; and transmitting, from the media capture device, the first media file and the second media file to the evaluation system on an external server, wherein the evaluation system is configured to display education profiles and media files the evaluator.

12. The educational evidence and evaluation system for generating media files and context parameters and linking the media files and context parameters to education profiles during evaluation of a subject of claim 11, further comprising linking the first media file and the first context parameter to the education profile of the first subject based on the first subject parameter before receiving the second input from the evaluator to capture the second media file.

13. The educational evidence and evaluation system for generating media files and context parameters and linking the media files and context parameters to education profiles during evaluation of a subject of claim 11, wherein the first media file and the second media file are selected from the group of: an image file, a video file, and an audio file.

14. The educational evidence and evaluation system for generating media files and context parameters and linking the media files and context parameters to education profiles during evaluation of a subject of claim 13, wherein the first context parameter indicates a characteristic of the first media file.

15. The educational evidence and evaluation system for generating media files and context parameters and linking the media files and context parameters to education profiles during evaluation of a subject of claim 13, wherein the first context parameter indicates a characteristic of the content of the first media file.

16. A system for generating media files and context parameters and linking the media files and context parameters to subject profiles during evaluation of a subject, the system comprising:
  a media capture device, configured to:
    receive a first input from an evaluator to capture a first media file;
    capture the first media file responsive to the evaluator's first input;
    store the first media file;
    receive a second input from the evaluator to capture a second media file;
    capture the second media file responsive to the evaluator's second input;
    store the second media file;
    receive a third input from the evaluator indicating a first context parameter;
    tag the first media file with the first context parameter;
    store the first context parameter;
    receive a fourth input from the evaluator indicating a second context parameter;
    tag the second media file with the second context parameter;
    store the second context parameter;
    receive a fifth input from the evaluator indicating a first subject parameter for an education profile of the first subject;
    link the first media file and the first context parameter to the education profile of the first subject based on the first subject parameter;
    receive a sixth input from the evaluator indicating a second subject parameter for an education profile of the second subject;
    link the second media file and the second context parameter to the education profile of the second subject based on the second subject parameter;
    determine that an available bandwidth on the network is below a threshold bandwidth for transmitting the first media file and second media file to an evaluation system;
    monitor the network to determine when the available bandwidth on the network rises above the threshold, wherein the available bandwidth is determined periodically over a period of time;
    determine that the available bandwidth is above the threshold; and
    transmit, from the media capture device, the first media file and the second media file to the evaluation system on an external server, wherein the evaluation system is configured to display education profiles and media files the evaluator,
  an external evaluation system server, configured to:
    receive the first media file and the second media file to the evaluation system on an external server, wherein the evaluation system is configured to display education profiles and media files the evaluator.

17. The system of claim 16, wherein the threshold bandwidth is a predetermined bandwidth, wherein the predetermined bandwidth is a minimum amount of bandwidth that allows the first media file and second media file to be transmitted to the evaluation system in a certain amount of time.

18. The system of claim 16, wherein the media capture device is further configured to:
  determine the threshold bandwidth based on a measured latency of a file being transmitted through the network.

19. The system of claim 16, wherein the available bandwidth is determined periodically over a period of time.

20. A computer-implemented method, comprising:
  receiving, at media capture device on a network, a first input from an evaluator to capture a first media file;
  capturing, at the media capture device, the first media file responsive to the evaluator's first input;
  storing the first media file;
  receiving, at the media capture device, a second input from the evaluator to capture a second media file;
  capturing, at the media capture device, the second media file responsive to the evaluator's second input;
  storing the second media file;
  automatically determining a first context parameter associated with the first media file;
  tagging the first media file with the first context parameter;
  storing the first context parameter;
  automatically determining a second context parameter associated with the second media file;
  tagging the second media file with the second context parameter;
  storing the second context parameter;
  automatically determining a first subject parameter for an education profile of a first subject;
  linking the first media file and the first context parameter to the education profile of the first subject based on the first subject parameter;
  automatically determining a second subject parameter for an education profile of a second subject;
  linking the second media file and the second context parameter to the education profile of the second subject based on the second subject parameter;
  determining that an available bandwidth on the network is below a threshold bandwidth for transmitting the first media file and second media file to an evaluation system;
  monitoring the network to determine when the available bandwidth on the network rises above the threshold;
  determining that the available bandwidth is above the threshold; and
  transmitting, from the media capture device, the first media file and the second media file to the evaluation system on an external server, wherein the evaluation system is configured to display education profiles and media files the evaluator.

* * * * *